(12) United States Patent
Cachelin

(10) Patent No.: US 12,079,934 B1
(45) Date of Patent: Sep. 3, 2024

(54) POINT CLOUD RE-SAMPLING USING HIERARCHICAL SPHERE OR DISK DISTRIBUTIONS

(71) Applicant: Apple Inc., Cupertino, CA (US)

(72) Inventor: Arnold H Cachelin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 17/815,160

(22) Filed: Jul. 26, 2022

Related U.S. Application Data

(60) Provisional application No. 63/226,084, filed on Jul. 27, 2021.

(51) Int. Cl.
   G06F 3/01 (2006.01)
   G06F 3/0346 (2013.01)
   G06T 17/20 (2006.01)

(52) U.S. Cl.
   CPC ............ G06T 17/205 (2013.01); G06F 3/011 (2013.01); G06F 3/0346 (2013.01); *G06T 2210/36* (2013.01)

(58) Field of Classification Search
   CPC ....... G06T 17/205; G06T 17/10; G06T 17/00; G06T 15/04; G06T 15/205; G06T 7/50; G06T 7/521; G06T 19/20; G06T 2210/56; G06T 2219/2016; G06T 2210/36; G06F 3/011; G06F 3/0346; G01S 7/4808
   See application file for complete search history.

(56) References Cited

U.S. PATENT DOCUMENTS

| | | | |
|---|---|---|---|
| 10,897,269 B2 | 1/2021 | Mammou | |
| 10,911,787 B2 | 2/2021 | Tourapis | |
| 11,252,441 B2 | 2/2022 | Tourapis | |
| 11,454,710 B2 | 9/2022 | Mammou | |
| 11,546,582 B2 * | 1/2023 | Son | H04N 19/597 |
| 11,552,651 B2 * | 1/2023 | Mammou | H04N 19/436 |
| 11,683,525 B2 * | 6/2023 | Mammou | G06T 9/001 |
| | | | 375/240.12 |
| 11,693,090 B2 * | 7/2023 | Zheng | G01S 17/931 |
| | | | 382/104 |

(Continued)

OTHER PUBLICATIONS

Ares Lagae & Phlip Dutre, "Poisson Sphere Distributions," Paper, 11th International Fall Workshop, Department of Computer Science, 2006, pp. 1-8.

(Continued)

*Primary Examiner* — Vijay Shankar
(74) *Attorney, Agent, or Firm* — Alexander A. Knapp; Kowert, Hood, Munyon, Rankin & Goetzel, P.C.

(57) ABSTRACT

A hierarchical sphere and/or hierarchical disk distribution is used to re-sample points of a point cloud to achieve a well distributed re-sampled point distribution. The re-sampled points are represented by integer values defining a given partition in which a respective re-sampled point resides and an index value. The index value identifies a sphere (or disk) within the given partition to which the re-sampled point belongs. The spatial location of the resampled point is determined based on the location of the partition to which the re-sampled point belongs and the location of a sample bin (e.g. sphere) in the partition having an index value communicated for the re-sampled point.

20 Claims, 15 Drawing Sheets

(56) References Cited

U.S. PATENT DOCUMENTS

| | | | |
|---|---|---|---|
| 11,748,916 B2* | 9/2023 | Mammou | G06T 9/001 |
| | | | 375/240.2 |
| 11,754,685 B2 | 9/2023 | Mammou | |
| 11,818,401 B2* | 11/2023 | Tourapis | G06T 9/005 |
| 2017/0214943 A1 | 7/2017 | Cohen et al. | |
| 2017/0347120 A1 | 11/2017 | Chou et al. | |
| 2018/0053324 A1 | 2/2018 | Cohen et al. | |
| 2019/0026956 A1 | 1/2019 | Gausebeck et al. | |

OTHER PUBLICATIONS

Ares Lagae & Phlip Dutre, "Poisson Sphere Distributions," Presentation, 11th International Fall Workshop, Department of Computer Science, Nov. 24, 2006, pp. 1-26.

\* cited by examiner

| Received Point Cloud Points in 3D Space | Re-Sampling 3D Partition | Re-Sampling Nearest Sphere |
|---|---|---|
| $X_1, Y_1, Z_1$ (2.1234, 3.1234, 4.1234) | (1, 1, 1) | 1 |
| $X_2, Y_2, Z_2$ (5.1234, 6.1234, 7.1234) | (1, 1, 1) | 1 |
| $X_3, Y_3, Z_3$ (8.1234, 9.1234, 10.1234) | (1, 1, 1) | 1 |
| $X_4, Y_4, Z_4$ (11.1234, 12.1234, 13.1234) | (1, 1, 1) | 4 |

*FIG. 4A*

| Point Location Indicated Using Floating Point Coordinates | Re-Sampled Point Location Indicated Using 4 Integers |
|---|---|
| (2.1234, 3.1234, 4.1234) | (1, 1, 1, 1) |
| (5.1234, 6.1234, 7.1234) | (1, 1, 1, 1) |
| (8.1234, 9.1234, 10.1234) | (1, 1, 1, 1) |
| (11.1234, 12.1234, 13.1234) | (1, 1, 1, 4) |

*FIG. 4B*

POINT CLOUD RE-SAMPLING USING HIERARCHICAL SPHERE OR DISK DISTRIBUTIONS

PRIORITY DATA

This application claims benefit of priority to U.S. Provisional Application Ser. No. 63/226,084, entitled "Point Cloud Re-Sampling Using Hierarchical Sphere or Disk Distributions," filed Jul. 27, 2021, and which is incorporated herein by reference in its entirety.

BACKGROUND

Technical Field

This disclosure relates generally to techniques for re-sampling points of a point cloud.

Description of the Related Art

Various types of sensors, such as light detection and ranging (LiDAR) systems, 3D-cameras, 3D scanners, etc. may capture data indicating positions of points in three dimensional (3D) space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors.

SUMMARY OF EMBODIMENTS

In some embodiments, a hierarchical sphere (or hierarchical disk) distribution is used to re-sample points of a point cloud and generate a re-sampled representation of the point cloud. For example, some point clouds may include clumpy or erratic point distributions, wherein the points are distributed in the point cloud based on where points are mostly easily captured by a capture device, such as a LiDAR scanner, as opposed to a point distribution wherein points are distributed based on a quantity of points that are needed to accurately represent respective portions of the point cloud. For example, dense regions of a captured point cloud may include a large volume of points because the points were easy to capture in the dense regions, not because the large volume of points is necessarily needed to represent these portions of the point cloud. In some embodiments, re-sampling a point cloud using a hierarchical sphere or hierarchical disk distribution generates a re-sampled version of the point cloud. Additionally, the re-sampled points may be ordered in a way such that the re-sampled version of the point cloud has "pyramidal" properties, meaning that the re-sampled points are ordered to fill in a space in more or less an even manner as the re-sampled points are added to the space to represent the point cloud. Said another way, re-sampled version of the point cloud may represent a stochastic subsample pyramid. Thus, the re-sampled version of the point cloud can be used for level of detail (LOD) or adaptive rendering, wherein re-sampled points of the point cloud are added evenly as the re-sampled version of the point cloud is rendered, so that when the re-sampled version of the point cloud is rendered at lower levels of detail and/or with fewer points, the general features of the point cloud are still visible (as opposed to, for example, rendering the points of the point cloud in an order that replays movements or recording order of some sensors, which may result in points in some regions of the point cloud being omitted). In some embodiments, re-sampling techniques as described herein may be extended to re-sampling of any type of three-dimensional (3D) point data, such as meshes, or other structures other than point clouds.

In some embodiments, a computer-readable medium stores program instructions, that when executed using one or more processors, cause the one or more processors to receive a point cloud comprising points located in three-dimensional (3D) space, wherein respective locations of the points in the 3D space are represented by 3D coordinate values for respective ones of the points of the point cloud. For example, X, Y, and Z coordinate values may be used to represent locations of the points in 3D space. In some embodiments, the coordinate values of the received point cloud may be represented as floating point numbers, such as 32-bit floating point numbers. The program instructions, when executed using the one or more processors, further cause the one or more processors to partition the 3D space into a plurality of 3D partitions and, for each respective 3D partition, assign points of the point cloud located in the respective 3D partition to a nearest sphere within the 3D partition, wherein a hierarchical sphere distribution is used to at least partially fill the respective 3D partition with spheres. The program instructions, further cause the one or more processors to generate re-sampled points corresponding to respective ones of the spheres to which at least a threshold number of points have been assigned. The locations of the re-sampled points are represented by a set of integers identifying the respective 3D partition to which a respective re-sampled point belongs and an index value identifying a sphere of the respective 3D partition to which the respective re-sampled point belongs. In some embodiments, the respective integers identifying the respective 3D partitions may be represented as 8 or 6 bit fixed point values, e.g. 8 bits for X, 8 bits for Z and 6 bits for Y. Additionally, the index values may be represented using 10 bit fixed point values. Thus, as an example comparison, wherein the input point cloud used three 32 bit floating point values to define a location of a point in 3D space, the re-sampled version of the point cloud may instead use a single 32 bit fixed point value (e.g. 8+8+6+10=32 (wherein 8 bits are used for the X part of the partition ID, 8 bits are used for the Z part of the partition ID, 6 bits are used for the Y part of the partition ID, and 10 bits are used for an index value of a sphere or disk in the identified 3D partition). The program instructions, when executed using the one or more processors, further cause the one or more processors to provide a re-sampled version of the point cloud comprising the sets of integers and the index values representing the locations of the re-sampled points. In some embodiments, a number of bits used to define the partition IDs and Index values may be adjustable and may be adjusted to adjust a number of partitions that are possible and a number of spheres that are used to at least partially fill an interior space of a given partition. These adjustments determine the volume of space that can be re-sampled, e.g. a volume of space the point cloud to be re-sampled can occupy and the fineness of the samples of the re-sampled version of the point cloud. In some embodiments, these adjustments can be made by a re-sampler/encoder dynamically to adapt the partitioning and re-sampling to conform to a specified bit budget for the re-sampled version of the point cloud.

In some embodiments, a computer-readable medium stores program instructions, that when executed using one or more processors, cause the one or more processors to receive a re-sampled point cloud comprising for each re-sampled point: a set of integers identifying a 3D partition to which the respective re-sampled point belongs and an index value identifying a sphere of the respective 3D partition to which the respective re-sampled point belongs. For example, the re-sampled point cloud may have been re-sampled using a hierarchical sphere (or hierarchical disk) distribution as described above. The program instructions, when executed using the one or more processors, further cause the one or more processors to reconstruct the re-sampled point cloud, wherein to re-construct the re-sampled point cloud, the program instructions cause the one or more processors to, for each of the re-sampled points, determine a location for the respective re-sampled point in 3D space based on adding a pre-calculated location value for the sphere to which the respective re-sampled point belongs to a location value for the 3D partition comprising the sphere to which the re-sampled point belongs.

In some embodiments, a device comprises a memory storing program instructions and one or more processors configured to execute the program instructions, wherein the program instructions, when executed using the one or more processors, cause the one or more processors to receive a re-sampled point cloud comprising, for each re-sampled point, a set of integers identifying a 3D partition to which the respective re-sampled point belongs and an index value identifying a sphere of the respective 3D partition to which the respective re-sampled point belongs. The program instructions, when executed using the one or more processors, further cause the one or more processors to reconstruct the re-sampled point cloud, wherein to re-construct the re-sampled point cloud, the program instructions cause the one or more processors to, for each of the re-sampled points, determine a location for the respective re-sampled point in 3D space based on adding a pre-calculated location value for the sphere to which the respective re-sampled point belongs to a location value for the 3D partition comprising the sphere to which the re-sampled point belongs.

BRIEF DESCRIPTION OF THE DRAWINGS

FIG. 4A illustrates a mapping of the points of the original version of the point cloud to re-sampled representations, wherein in the re-sampled representation the respective points are identified via a partition to which the point belongs and a nearest sphere within the partition to which the point has been assigned, according to some embodiments.

FIG. 4B further illustrates the re-sampled point location information for the re-sampled version of the point cloud, wherein locations in 3D space of the points of the point cloud that were previously indicated using three floating point values are instead indicated in the re-sampled version of the point cloud using four integer values, according to some embodiments.

Figure 1A:
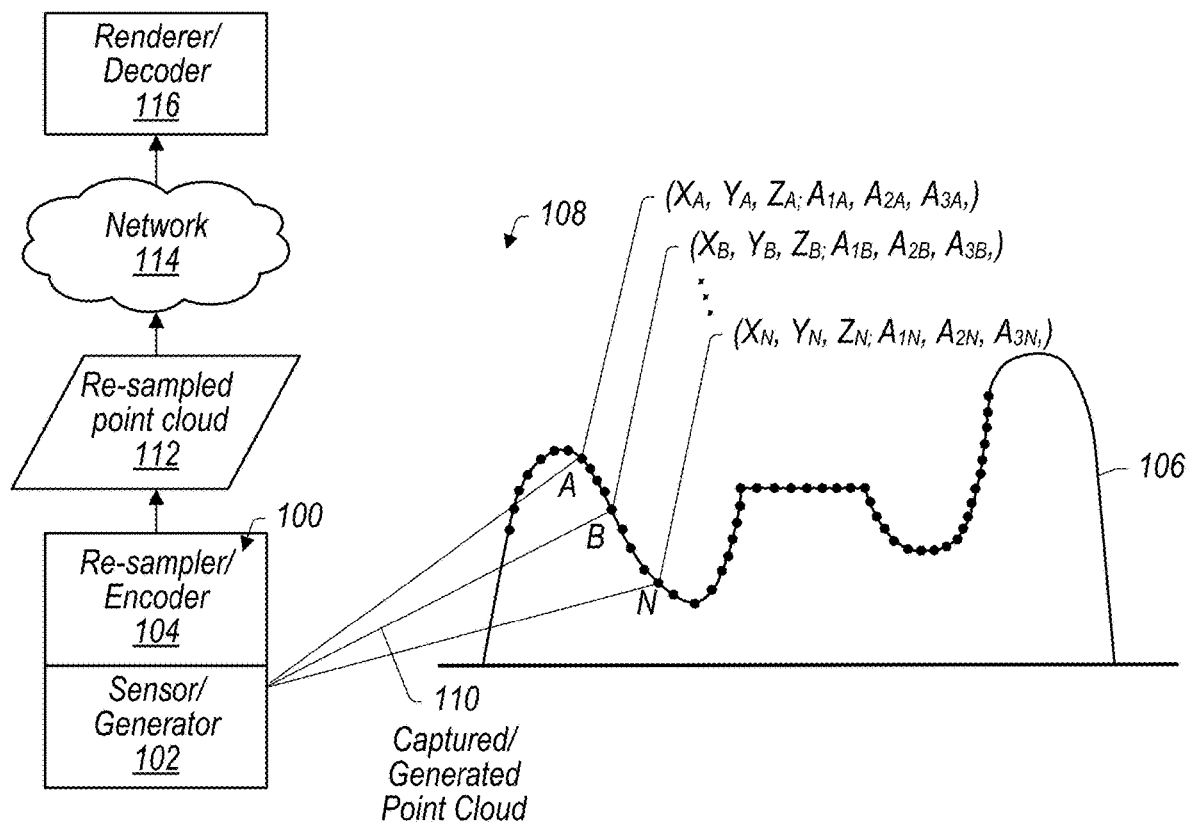
FIG. 1A illustrates a system comprising a sensor that captures information for points of a point cloud (or a generator that generates the information for the points of the point cloud) and a re-sampler that re-samples the point cloud into a re-sampled version, wherein the re-sampled point cloud information is sent to a renderer or decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LiDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

Due to such limitations, in some situations, a point cloud may be sent and/or rendered progressively. For example, instead of sending a point cloud as a single unit comprising all of the points of the point cloud, the point cloud may be streamed such that data for some points, such as the initially streamed points, is completely communicated while data for other points is still being communicated. Thus a rendering device can render the fully communicated points while still receiving information for other ones of the points of the point cloud. In some situations, a rendering device may progressively render a point cloud that has been fully communicated to the rendering device, for example due to limitations with regard to processing resources required to render the point cloud at the rendering device, as one example.

In some circumstances, points of a point cloud may be captured or generated in an un-even distribution, meaning that some portions of the point cloud are densely filled with points while other portions of the point cloud are sparsely filled. For some point clouds it may make sense to have such a distribution, but for other point clouds such an un-even distribution may be more a function of how the point cloud was captured by a capturing device or a generating device, then a requirement to accurately communicate or represent the point cloud. Thus in some situations, it is not necessary to include a full volume of captured points in densely populated regions of the point cloud to accurately communicate or represent the point cloud. However, typical decimation procedures, such as decimating some fraction (e. g. ½, ¹/₁₀, etc.) of the points of the point cloud affects both points in the dense region and points in the sparse region (which are desired to be kept to accurately represent the point cloud). Thus a typical decimation procedure may further exacerbate a lack of points in sparse regions.

Also, such an un-even distribution of the points of the point cloud may result in un-even rendering when the point cloud is progressively rendered. For example, points in spare regions may not be rendered in initial stages of the progressive rendering, leading to holes or missing regions of the point cloud. However, a re-sampled version of a point cloud, as described herein, re-sampled using a hierarchical sphere and/or hierarchical disk distribution, may result in a more even distribution of the re-sampled points of the point cloud.

In some circumstances, points of a point cloud being communicated to a receiving device, such as a decoder or rendering device, may be ordered in an order the points were captured, or in another arbitrary order. However, in some situations this may lead to initially communicated points (that may be rendered while other points are still being communicated) including a large number of points in some regions of the point cloud and few or no points in other regions of the point cloud. This may result in a less than desirable progressive rendering experience because the regions for which few or no points are included in the initially communicated points may appear as holes or missing parts in the progressively rendered point cloud (during the initial phases of the progressive rendering). In order to improve progressive rendering, in some embodiments, the re-sampled points of the point cloud re-sampled using a hierarchical sphere or hierarchical disk distribution, as described herein, may be ordered, as explained in more detail below, based on index values of respective spheres or disks to which the re-sampled points correspond. Because the spheres and disks follow a well-distributed distribution, the re-sampled points that are progressively streamed and/or rendered based on index values result in a pyramidal ordering of the re-sampled points, such that the re-sampled points fill in respective regions of the point cloud to an equivalent re-sampled point distribution. Thus, avoiding sparely populated portions of the point cloud from being omitted or shown with holes during initial stages of a progressive streaming and/or progressive rendering due the points for the spare regions not being included in the initially streamed points.

In some embodiments, re-sampled points of a re-sampled point cloud, re-sampled using a hierarchical sphere or hierarchical disk distribution, as described herein, may be communicated using fewer bits than the non-re-sampled points of the point cloud. For example, captured points of the point cloud may include spatial information for the respective points, wherein a location of a given point is communicated using three floating point values (e.g. a floating point X coordinate, a floating point Y coordinate, and a floating point Z coordinate). Some such captured points may represent each coordinate value (e.g. X, Y, and Z) as a 32 bit floating point value. However, in some embodiments, a re-sampled point, re-sampled using a hierarchical sphere or hierarchical disk distribute, as described herein, may be communicated using a single 32-bit fixed point value (as opposed to three 32 bit floating point values).

For example, a 3D space may be partitioned into a plurality of 3D partitions (e.g. boxes, rectangular prisms, voxels, etc.). Additionally, each of the 3D partitions may be filled with spheres that fill portions of the 3D partition using a pre-calculated sphere distribution known to an encoder and a decoder. The re-sampled points of the re-sampled version of the point cloud correspond to ones of the spheres of the respective 3D partitions, wherein only spheres to which actual points of the original point cloud have been assigned are included in the re-sampled version of the point cloud. Because the distribution of spheres in a given partition is pre-calculated and known by the encoder and decoder, this information is not required to be communicated to define a 3D location of a re-sampled point. Instead, only an index value indicating to which sphere the re-sampled point corresponds and to which partition the sphere for the re-sampled point belongs is needed to define a location of the re-sampled point in 3D space. For example, a known pre-calculated location for a sphere relative to a reference point of a partition, such as a corner or center of the partition can be added to a location of the reference point in 3D space. Note that in some embodiments, the information for calculating the hierarchical sphere distribution may be sent to a decoding device as an initial step, but it is not necessary to be re-send once sent initially.

Also, some captured point clouds may include errant points, such as individual points in sparse regions that are more likely to represent measurement errors than actual points of the point cloud. In some embodiments, a threshold number of points may be required to be assigned to a given sphere in a hierarchical sphere distribution of a partition in order for a re-sampled point corresponding to the sphere to be included in the re-sampled version of the point cloud. Thus, such errant points that are isolated (e.g. located away from other points of the point cloud) may be culled from the re-sampled version of the point cloud.

In some embodiments, point sizes of the re-sampled points may be progressively adjusted (e.g. from large to smaller) as the number of re-sampled points rendered for the re-sampled version of the point cloud increases. For example, because the locations of the spheres is pre-calculated, and because the index ordering of the spheres is pre-calculated, a minimum distance between spheres at varying levels of re-sampled point density can be determined. By knowing the minimum distance between spheres, it is possible to determine point sizes for re-sampled points at varying density levels such that the points are not so large as to interfere with one another. Also, as more points are added, e.g. the density level increases, the size of the re-sampled points can be automatically adjusted to avoid point interference at other density levels. Including larger sized re-sampled points at lower re-sampled point densities may improve visual appeal of the point cloud. This is because the point cloud may appear more "filled in" even though there are fewer points, because the re-sampled points that are included at the lower density levels have larger diameters.

Even though the sphere distribution is pre-calculated and known to both the encoder and decoder, the re-sampled point density can still be adjusted by adjusting a size of the 3D partitions (e.g. cubes, rectangular prisms, voxels, etc.). For example, the spheres will be more spaced out in a larger 3D partition and more closely spaced in a smaller 3D partition. Thus, a user may define a desired resolution of a re-sampled point cloud, and a re-sampling device, which may also be an encoding device for encoding the re-sampled point cloud, automatically determines 3D partitioning sizes needed to implement the desired re-sampled point resolution. Alternatively, a user may specify a bit budget for the re-sampled point cloud and a re-sampling device and/or encoding device may determine a partition sizing required to achieve the indicated bit budget.

In some embodiments, the hierarchical sphere distribution used to at least partially fill the respective interiors of the 3D partitions may have a distribution that "tiles" meaning that when copies of the hierarchical sphere distribution are placed next to each other, such as in adjacent 3D partitions, the re-sampled point distributions match-up at the interfaces such that density behavior blends seamlessly across 3D partitions. This also allows for scaling the re-sampled point resolution by partitioning the 3D space into more partitions, wherein each partition repeats a "tile-able" hierarchical sphere distribution.

FIG. 1A illustrates a system comprising a sensor that captures information for points of a point cloud (or a generator that generates the information for the points of the point cloud) and a re-sampler that re-samples the point cloud into a re-sampled version, wherein the re-sampled point cloud information is sent to a renderer or decoder, according to some embodiments.

System 100 includes sensor 102 and re-sampler and/or encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to re-sampler and/or encoder 104, wherein re-sampler and/or encoder 104 generates a re-sampled and/or compressed version of the point cloud (re-sampled and/or compressed attribute information 112) that is transmitted via network 114 to renderer and/or decoder 116. In some embodiments, a re-sampled and/or compressed version of the point cloud, such as re-sampled and/or compressed attribute information 112, may be included in a common compressed point cloud that also includes compressed spatial information for the points of the point cloud or, in some embodiments, compressed spatial information and compressed attribute information may be communicated as separate files.

In some embodiments, re-sampler and/or encoder 104 may be integrated with sensor 102. For example, re-sampler and/or encoder 104 may be implemented in hardware or software included in a sensor device, such as sensor 102. In other embodiments, re-sampler and/or encoder 104 may be implemented on a separate computing device that is proximate to sensor 102.

Figure 1B:
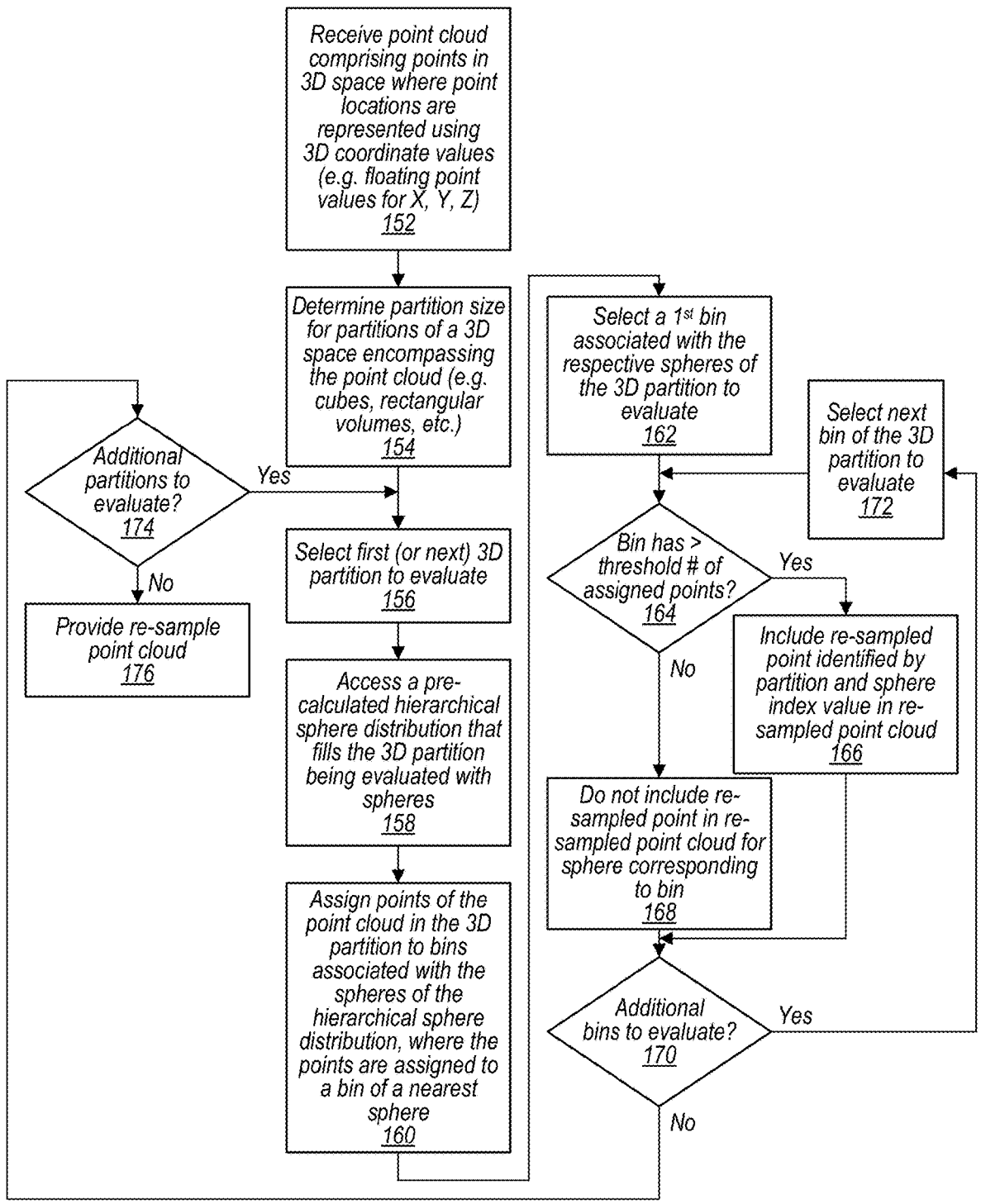
FIG. 1B illustrates a process for generating a re-sampled point cloud using a hierarchical sphere (and/or disk) distribution, according to some embodiments.

FIG. 1B illustrates a process for generating a re-sampled point cloud using a hierarchical sphere (and/or disk) distribution, according to some embodiments. At block 152, a re-sampling device, such as re-sampler and/or encoder 104, receives a point cloud comprising points in three-dimensional (3D) space. The point locations are represented using 3D coordinates, Cartesian coordinates such as X, Y, and Z, radial coordinates, such as r, θ, h, or spherical coordinates, such as r, θ, φ, etc. The 3D coordinates may be represented as floating point values, such as 32-bit floating point values or other bit range values. At block 154, a partition size for partitions of a 3D volume that encompasses the point cloud is determined, wherein point cloud may be partitioned into a plurality of 3D partitions, such as cubes, rectangular prisms, voxels etc. In some embodiments, a total number of partitions may not be determined initially, but instead only a partition size may be determined initially. Later, an overall volume of the point cloud may be determined based on the indices of the partitions required to fully re-sample the points of the point cloud. For example, the X, Y, and Z values of the partition identifies along with the partition size may indicate a size of the point cloud in the X, Y, and Z directions. Though, the re-sampler/encoder may not necessarily need to determine the overall dimensions or volume prior to re-sampling the point cloud. At block 156, a first (or next) one of the 3D partitions from block 154 is selected to be evaluated for re-sampling of the points of the original point cloud. The points of the original point cloud that fall within the selected 3D partition to be evaluated remain associated with respective locations in 3D space falling within the bounds of the 3D partition selected to be evaluated (e.g. the points keep their respective locations). Also, at block 158, a pre-calculated hierarchical sphere distribution that at least partially fills the 3D space of a given partition with spheres is accessed for use in performing the re-sampling. The pre-calculated hierarchical sphere distribution comprises spheres at locations in 3D space that are pre-calculated and known to both the re-sampling device, and a rendering device, such as renderer and/or decoder 116. As further discussed in FIG. 10, for points of the original point cloud falling within a plane, a similar evaluation may be performed in 2D using 2D partitions and a hierarchal disk distribution within the respective 2D partitions.

For example, in some embodiments an encoder and a decoder may use a normative hierarchical sphere distribution for each given 3D partition. The same normative hierarchical sphere distribution may be used to evaluate each 3D partition, wherein the hierarchical sphere distribution has a property such that the 3D partitions filled with spheres according to the hierarchical sphere distribution are "stackable", meaning that the hierarchical sphere distributions can be repeatedly used in adjacent 3D partitions that stack on top of one another or side to side with one another. Because the hierarchical sphere distributions are stackable, they repeat in a way such that there is a smooth and/or even distribution of spheres across boundaries of adjacently stacked 3D partitions. Also, because the hierarchical sphere distributions are stackable, the number of 3D partitions to be filled with spheres of the hierarchical sphere distribution is configurable, wherein the same pre-calculated hierarchical sphere distribution can be re-used to fill whatever number of 3D partitions are needed to be filled. For example, using smaller 3D partitions results in generating more 3D partitions that are each filled with spheres according to the hierarchal sphere distribution, which also means that the re-sampled point resolution is greater. This is because each given 3D partition encompasses a smaller part of the original point cloud when smaller (or more) 3D partitions are used. In some embodiments, a re-sampled point resolution is an adjustable parameter that may be specified by a user of the re-sampling device, such as by a user of a re-sampler and/or encoder 104. Also, in some embodiments, a user of the re-sampling device may indirectly specify the re-sampled point resolution by specifying other parameters that limit the re-sampled point resolution, such as by specifying an encoding bit budget. For example, a user may specify a bit budget for the re-sampled point cloud and a re-sampling device and/or encoding device may determine a partition sizing required to achieve the indicated bit budget.

At block 160 points of the original point cloud included in the 3D partition selected to be evaluated are assigned to bins corresponding to the closest one of the spheres in the 3D partition being evaluated. In some embodiments, a spatial search acceleration structure may be used to assign points of the original point cloud to bins of nearest neighboring spheres. For example, instead of having to compute a distance between a given point and each sphere in the 3D partition to determine a nearest sphere for the given point, in some embodiments a cube array may be used to simplify the search. For example, each cube of the cube array may have an associated sub-set of the spheres falling within the given cube. Thus, a search for a nearest sphere for a given point may be performed by first determining which cube of the 3D partition the point belongs to and then only determining distances to spheres in the cube to which the point belongs or distances to spheres in the given cube and neighboring cubes. Since the hierarchical sphere distribution more or less evenly distributes spheres in the 3D partition, the respective cubes used in the search acceleration will include equivalent numbers of spheres. Additionally, another search acceleration technique that may be used is using the known distance between spheres in the hierarchical sphere distribution to determine when a closest neighboring sphere has been determined and the search can therefore be completed for the given point being evaluated. For example, if a distance between a given point being evaluated and a given one of the spheres in a cube is determined to be half (or less than half) of a minimum separation distance between the spheres in the hierarchical sphere distribution, then once a sphere with such a short distance to the point is found, it can be inferred that there are no other spheres closer to the point. In such a situation it is not necessary to continue to calculate distances between the point being evaluated and other ones of the spheres in the cube, because no other sphere could be closer than the sphere that is half or less than half the minimum separation distance from the point.

Next, the bins associated with the spheres are evaluated to determine whether or not a re-sampled point at the sphere location should be included in the re-sampled version of the point cloud. For example, at block 162 a first bin for the spheres of the 3D partition being evaluated is selected for evaluation for inclusion of a point at the sphere location corresponding to the selected bin. At block 164, it is determined if the bin being evaluated has more than a threshold number of points assigned to the bin (e.g. at least a threshold number of points have the sphere corresponding to the bin as a closest neighboring sphere). If the number of assigned points, assigned to the bin being evaluated, is greater than the threshold, then at block 166, a re-sampled point for the bin being evaluated is included in the re-sampled version of the point cloud, wherein the re-sampled point is identified by the 3D partition to which it belongs and by an index value for the sphere (and corresponding bin). Because the hierarchal sphere distribution is normative, a renderer and/or decoding device can determine a same location for the re-sampled point based on the index value, wherein a same indexing scheme is used to identify the spheres and corresponding bins at both the re-sampler and/or encoder and the renderer and/or decoding device. In some embodiments, the threshold number of assigned points for inclusion of a re-sampled point may be a single point (e.g. 1), or in some embodiments a larger threshold may be used. In some embodiments, using a larger threshold may avoid stray points that are more likely measurement noise than actual parts of the point cloud from being included in the re-sampled version of the point cloud. At block 168, if the number of points assigned to the given bin being evaluated is less than the threshold number of points for inclusion in the re-sampled version of the point cloud, then a re-sampled point at the 3D location of the sphere corresponding to the bin being evaluated is not included in the re-sampled version of the point cloud. At block 170, it is determined if there are additional bins (corresponding to additional spheres) to be evaluated in the given 3D partition being evaluated. If so, a next bin to be evaluated is selected at block 172 and the process (e.g. blocks 164 through 170) are repeated for the next bin. In some embodiments, bins can be evaluated as described in blocks 164 through 170 in parallel. If it is determined at block 170 that there are not additional bins to be evaluated for the given 3D partition being evaluated, then the evaluation of the selected 3D partition is complete and a determined set of re-sampled points for the selected 3D partition has been determined, wherein the re-sampled points are identified by the coordinates of the 3D partition and index values for the bins to which the re-sampled points correspond.

At block 174, it is determined whether there are additional 3D partitions to be evaluated, if so a next 3D partition to be evaluated is selected at block 156, and the process repeats for the next 3D partition to be evaluated (e.g. blocks 156 through 174 are repeated, as appropriate). In some embodiments, 3D partitions may be evaluated in parallel instead of being sequentially evaluated. However, for ease of illustration FIG. 1B shows a sequential process. If all of the 3D partitions have been evaluated, at block 176, the re-sampled version of the point cloud is provided, wherein the re-sampled points of the re-sampled version of the point cloud are identified using four integer values, such as X, Y, and Z integer values that identify a given one of the 3D partitions and an index value that identifies a given one of the bins of the identified 3D partition that has a corresponding sphere at a known location in the 3D partition, wherein the location is known by the decoder according to the normative pre-calculated hierarchical sphere distribution. However, in some embodiments, a non-normative hierarchical sphere distribution may be used. In such cases an encoded bit stream may include instructions for pre-calculating the hierarchical sphere distribution and a renderer and/or decoder may initially pre-calculate the hierarchical sphere distribution, but then re-use the pre-calculated hierarchical sphere distribution for each of the 3D partitions. In some embodiments, the coordinates of the re-sampled points may be spatially shuffled using bit-reversed Morton coding or some other quasi-random ordering for 3D integer grid locations.

In some embodiments, multiple point clouds can be merged and re-sampled. For example, prior to performing block 154, or following block 154, a second point cloud could be merged with the received point cloud. Because a re-sampled point is included when a bin has greater than a threshold number of assigned points, merging a second point cloud that results in more points being assigned to the respective bins has the effect of including more points in the re-sampled version of the point cloud corresponding to bins that otherwise would not have the threshold number of assigned points for inclusion. However, for re-sampled points corresponding to bins that otherwise would have had at least the threshold number of assigned points, including additional assigned points due to merging of another point cloud with the first point cloud does not result in more re-sampled point being included in the re-sampled point cloud for those bins. For example, it just adds more assigned points to the given bins. However, since the bins otherwise would have had a number of assigned points exceeding the threshold, adding more assigned points to the given bin still results in a single re-sampled point being included for the given bin (as opposed to adding more points in the re-sampled version). In this way a point cloud can be merged wherein sparse regions are more filled due to the merger, but dense regions do not become more dense and/or clumpy by stacking points on top of each other.

Figure 2:
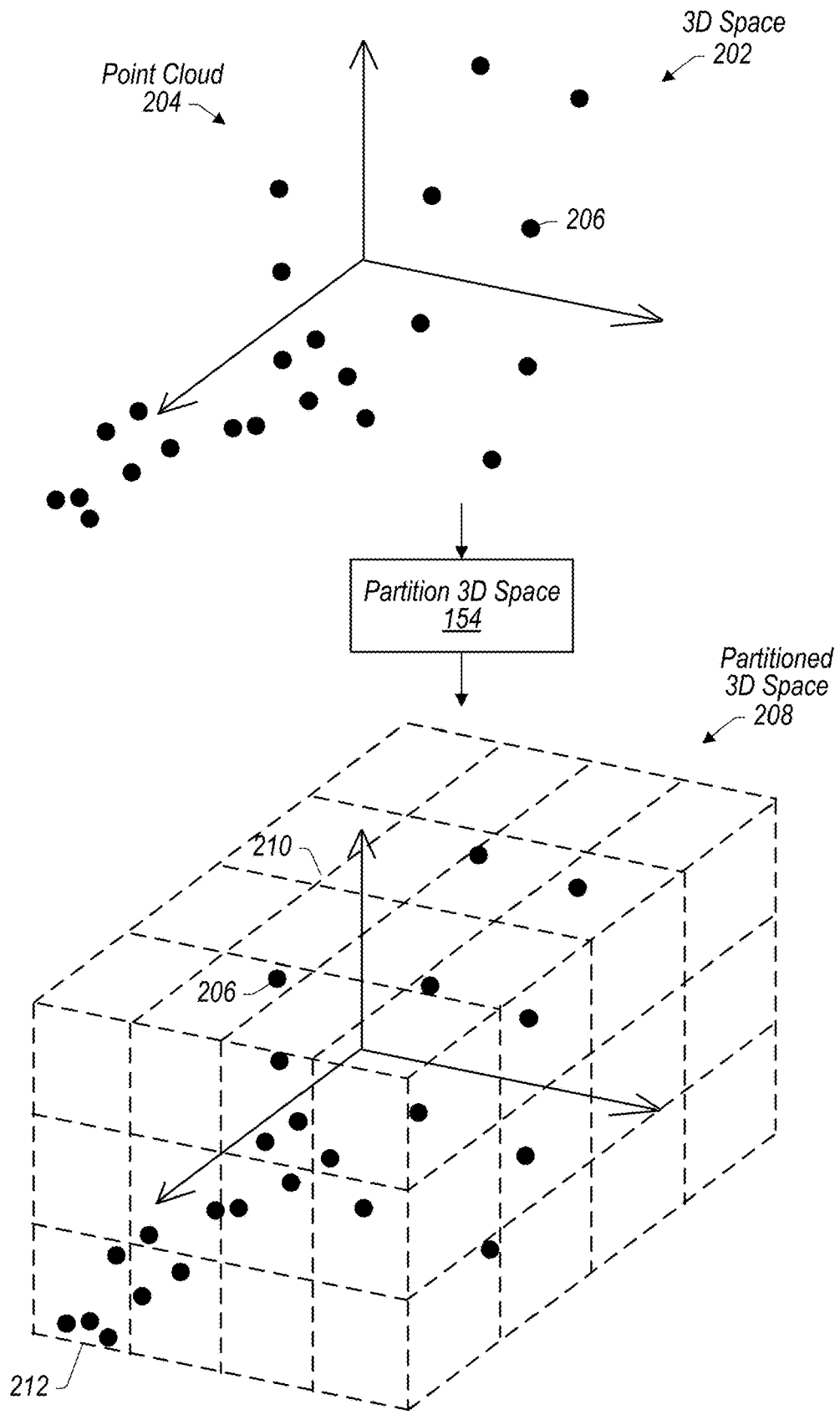
FIG. 2 illustrates points of a point cloud in 3D space, wherein the 3D space is partitioned into a plurality of partitions, according to some embodiments.

FIG. 2 illustrates points of a point cloud in 3D space, wherein the 3D space is partitioned into a plurality of partitions, according to some embodiments. For example, a point cloud received at block 152 of FIG. 1B may be point cloud 204 comprising points 206 located in 3D space 202. As shown by block 154 of FIG. 2, the 3D space 202 may be partitioned into a plurality of 3D partitions 210 that result in a partitioned 3D space 208. For example, partitioning the 3D space 202 as described in block 154 of FIG. 2 may be equivalent to partitioning the 3D space as described in block 154 of FIG. 1B. Also, as shown in FIG. 2, respective ones of the points 206 of the point cloud 204 reside in different ones of the 3D partitions 210 based on the respective locations of the points of the point cloud in the partitioned 3D space 208.

Figure 3A:
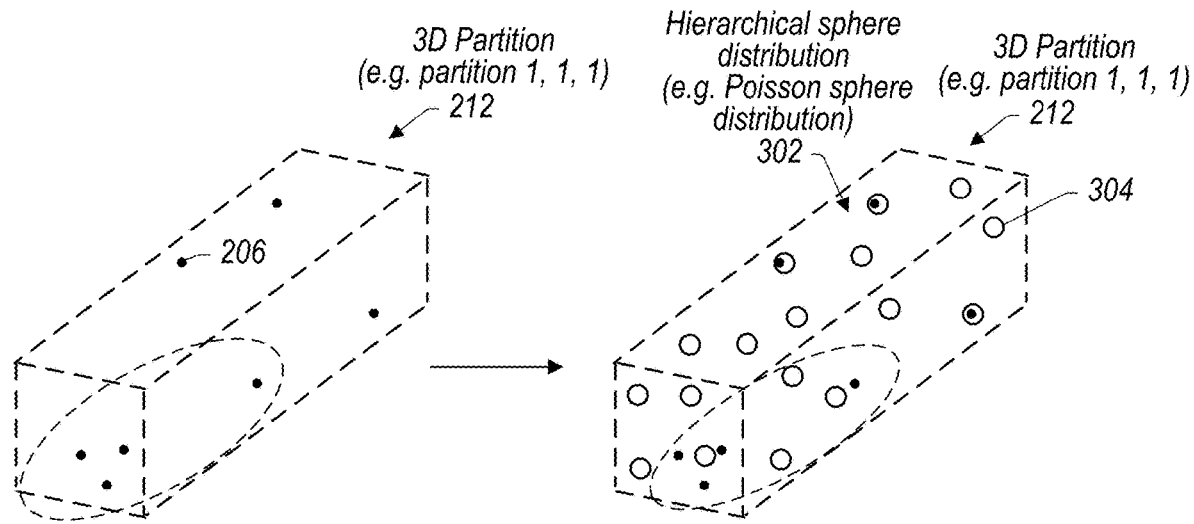
FIG. 3A illustrates an example partition comprising points of the point cloud, wherein the partition is also partially filled with spheres organized according to a hierarchical sphere distribution, and wherein the points of the point cloud are assigned to bins associated with respective ones of the spheres that are closest to the respective points of the point cloud included in the partition, according to some embodiments.

FIG. 3A illustrates an example partition comprising points of the point cloud, wherein the partition is also partially filled with spheres organized according to a hierarchical sphere distribution, and wherein the points of the point cloud are assigned to bins associated with respective ones of the spheres that are closest to the respective points of the point cloud included in the partition, according to some embodiments. For example, 3D partition 212 as shown in FIG. 2 is shown in more detail in FIG. 3A. Note that the location of 3D partition 212 may be described using three integers, such as 1, 1, 1, (wherein the three integers indicate that the given 3D partition is the first partition in the X direction, the first partition in the Y direction, and the first partition in the Z direction in the partitioned 3D space 208, for example from an origin points, such as the front lower left corner of the partitioned 3D space 208 (though various other origin and/or reference points may be used to define 3D partition locations). Also, FIG. 3A on the right hand side shows hierarchical sphere distribution 302 comprising spheres 304 included in 3D partition 212. For example, in some embodiments, filling the volume of the 3D partition being evaluated with spheres of a pre-calculated hierarchical sphere distribution as described at block 158 of FIG. 1B may result in filling 3D partition 212 with spheres 304 of hierarchical sphere distribution 302 as shown in FIG. 3A.

Figure 3B:
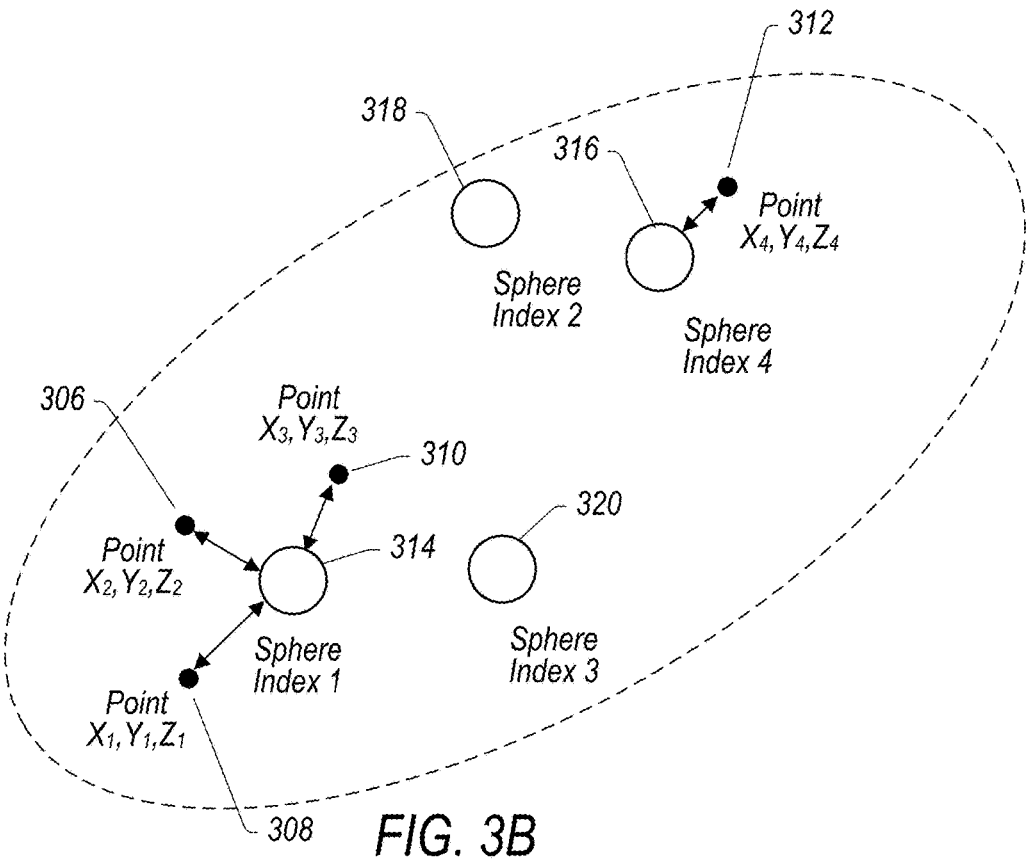
FIG. 3B illustrates points of the point cloud being assigned to bins for different ones of the spheres, wherein multiple points are assigned to some spheres, single points are assigned to other spheres, and for spheres without a near point, no points are assigned, according to some embodiments.

FIG. 3B illustrates points of the point cloud being assigned to bins for different ones of the spheres, wherein multiple points are assigned to some spheres, single points are assigned to other spheres, and for spheres without a near point, no points are assigned, according to some embodiments. For example, points 306, 308, and 310 are assigned to sphere 314 with sphere index (e.g. bin index) 1. Also point 312 is assigned to sphere 316 with sphere index (e.g. bin index 4). Thus, points 306, 308, and 310 become a single re-sampled point 1,1,1,1 in the re-sampled version of the point cloud, and point 316 becomes a re-sampled point 1,1,1,4. That is assuming a threshold for inclusion of 1 assigned point per bin for the re-sampled point corresponding to the bin to be included in the re-sampled version of the point cloud. If the threshold for inclusion of a re-sampled point is at least 2 or more assigned points per bin, then the re-sampled point cloud would include a re-sampled point 1,1,1,1, but there would not be a re-sampled point 1,1,1,4, because only one point is assigned to the bin for sphere 316.

FIG. 4A illustrates a mapping of the points of the original version of the point cloud to re-sampled representations, wherein in the re-sampled representation the respective points are identified via a partition to which the point belongs and a nearest sphere within the partition to which the point has been assigned, according to some embodiments. As can be seen in FIG. 4A larger floating point values for the points in the received point cloud can be represented with fewer bits by identifying a 3D partition (e.g. 1, 1, 1) and an index value for a sphere and associated bin to which the point of the original point cloud is assigned.

In some embodiments, a similar technique may be used to sort the points without necessarily re-sampling the points. For example, in some embodiments, points 1, 2, and 3 that are each assigned to sphere 1 (314) may be retained instead of merged. In such embodiments, a lossless re-sorting may be performed, wherein the points are sorted into a pyramidal order. In some such embodiments, that employ lossless re-sorting, the points may retain their original X, Y, Z coordinate values and attribute values. However, the points may be ordered in a pyramidal order for use in adaptive streaming or adaptive rendering and/or other techniques described herein.

FIG. 4B further illustrates the re-sampled point location information for the re-sampled version of the point cloud, wherein locations in 3D space of the points of the point cloud that were previously indicated using three floating point values are instead indicated in the re-sampled version of the point cloud using four integer values, according to some embodiments. As can be seen in FIG. 4B, the spatial representation of the re-sampled points can be collapsed into a 4 integer value, such as (1,1,1,1) or (1,1,1,4).

Figure 5A:
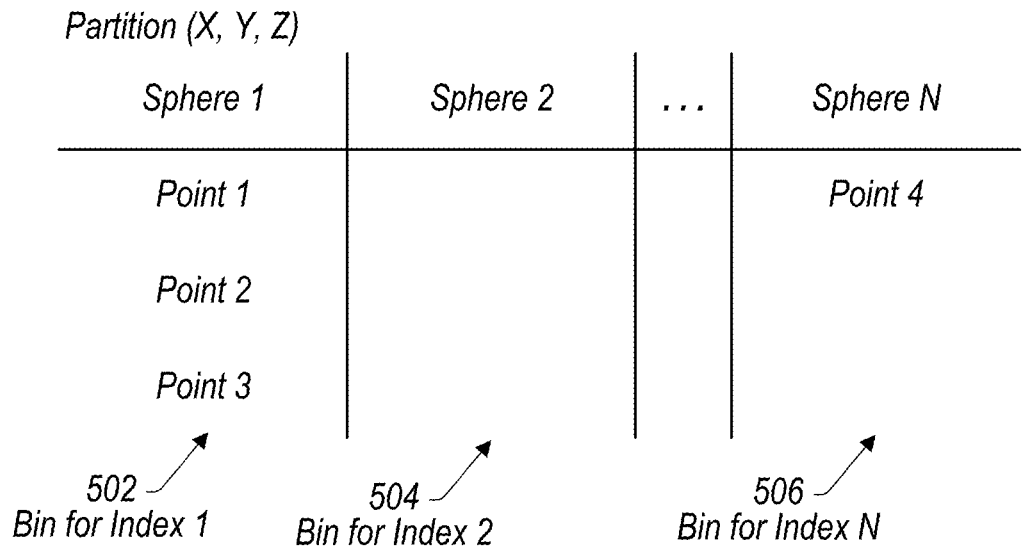
FIG. 5A illustrates bins for respective ones of the spheres of a given partition, wherein respective points of the point cloud have been assigned to respective ones of the bins associated with closest ones of the spheres to the respective points, according to some embodiments.

FIG. 5A illustrates bins for respective ones of the spheres of a given partition, wherein respective points of the point cloud have been assigned to respective ones of the bins associated with closest ones of the spheres to the respective points, according to some embodiments. In some embodiments, a histogram is created for each bin that corresponds to a sphere. For example, FIG. 5A shows bin 502 with index value 1 that corresponds with sphere 1 (314), bin 504 with index value 2 that corresponds with sphere 2 (318), and bin 506 with index value 4 that corresponds with sphere 4 (316). Note that bin 506 is listed in FIG. 5 as corresponding to sphere N and having index value N, because any number of spheres may be included, for example based on a number of spheres included in the hierarchical sphere distribution that is used.

Figure 5B:
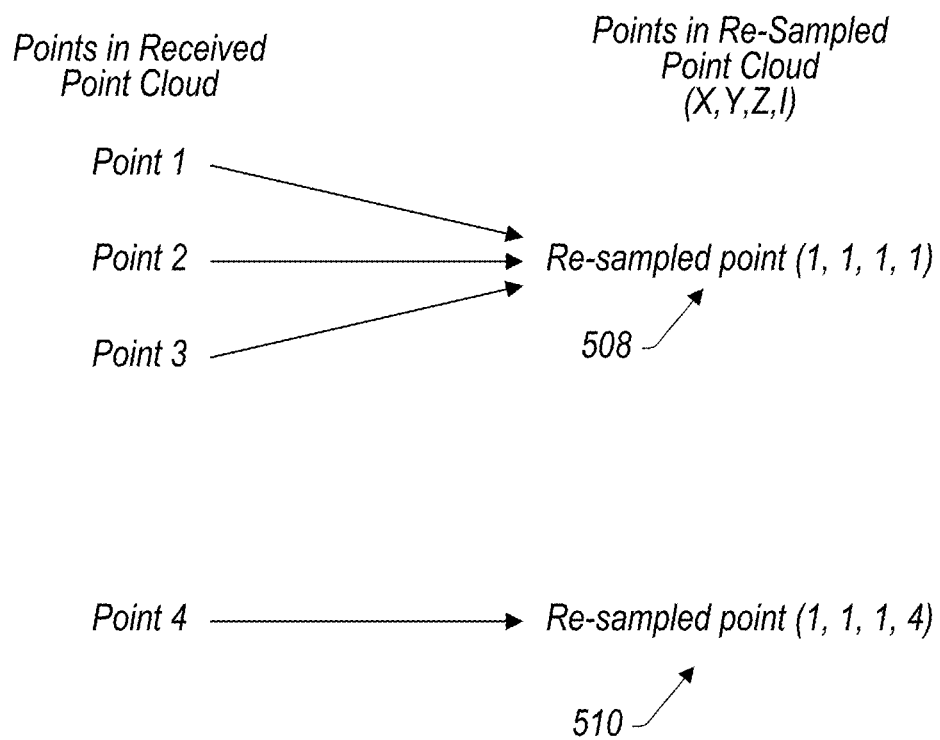
FIG. 5B illustrates points of the point cloud being mapped to re-sampled points in the re-sampled version of the point cloud, wherein the respective re-sampled points in the re-sampled version of the point cloud correspond to respective ones of the spheres of the partition to which one or more of the points of the original point cloud have been assigned, according to some embodiments.

FIG. 5B illustrates points of the point cloud being mapped to re-sampled points in the re-sampled version of the point cloud, wherein the re-sampled points in the re-sampled version of the point cloud correspond to respective ones of the spheres of the partition to which one or more of the points of the original point cloud have been assigned, according to some embodiments. As mentioned above, the three points (306, 308, and 310) of point cloud 204 that are all assigned to bin 502 corresponding to sphere 1 (314) may be collapsed into a single re-sampled point 508. Also, depending on the threshold number of assigned points for inclusion in the re-sampled point cloud (e.g. if the threshold=1), then point 4 (312) is included as re-sampled point 510.

Figure 6:
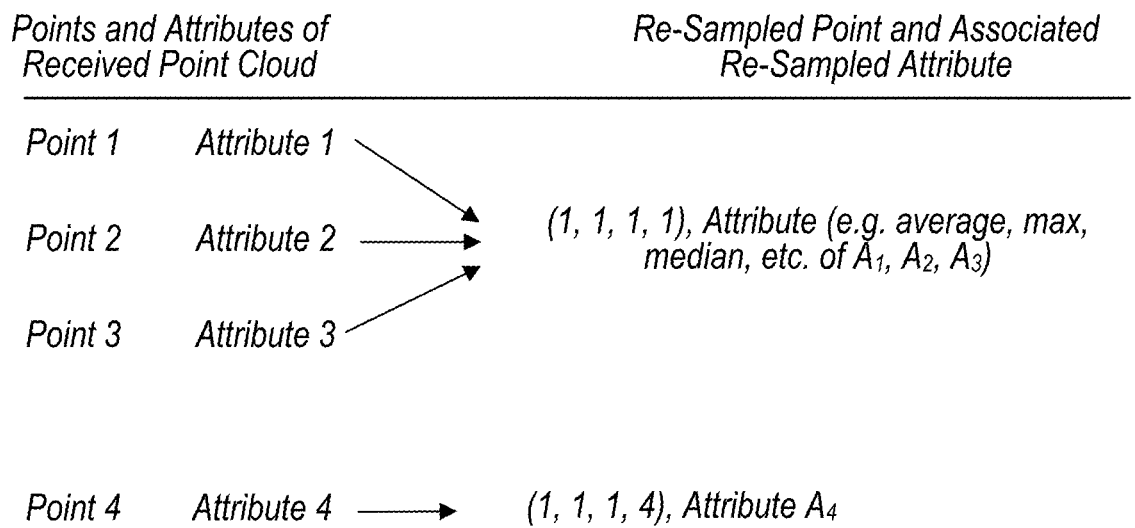
FIG. 6 illustrates attribute values being determined for points in the re-sampled version of the point cloud, according to some embodiments.

FIG. 6 illustrates attribute values being determined for points in the re-sampled version of the point cloud, according to some embodiments. As discussed in FIG. 5B, multiple points in the original point cloud may be assigned to a same bin corresponding to a single re-sampled point. Thus, the attribute values of the original points may be combined to determine an attribute value for the re-sampled point. For example, attributes may be colors (e.g. RGB or YCbCr) or other types of attributes associated with the points, such as normal vectors, reflectivity, etc. In some embodiments, attribute values may be averaged to determine an attribute value for a re-sampled point. Alternatively, a mean value may be selected for a corresponding attribute value of a re-sampled point based on the same type of attribute value for the points of the original point cloud. In some embodiments, other techniques may be used to determine a composite attribute value for the re-sampled point from corresponding attribute values of each of the points of the original point cloud assigned to the same bin corresponding to the re-sampled point. For example, in some embodiments, a max value or a minimum value may be selected.

In some embodiments, points assigned to a same bin having an attribute value that is an outlier as compared to other points assigned to the bin may be removed from the bin and instead signaled individually, for example using its original X,Y,Z coordinates and the outlier attribute value. For example, a point with a high or low color divergence may be removed from the bin. In some embodiments, the removed point may be omitted and not signaled as an individual point. For example, an attribute value of the outlier point may not be used in determining an average, or mean attribute value for the re-sampled point. Also, in some embodiments a re-sampled point corresponding to a bin with assigned points having a high or low color divergence, wide confidence range, or high salience may be omitted and instead signaled as individual points for example using original X,Y,Z coordinates and attribute values. For example, a re-sampling and/or encoding device may determine points of the original point cloud assigned to a given bin represent an edge of a surface in the point cloud, for example based on attribute values and/or spatial information. In some embodiments, the re-sampling and/or encoding device may exclude points that are not on the edge from being used in determining a composite attribute value for the re-sampled point that will represent a part of the edge.

Figure 7A:
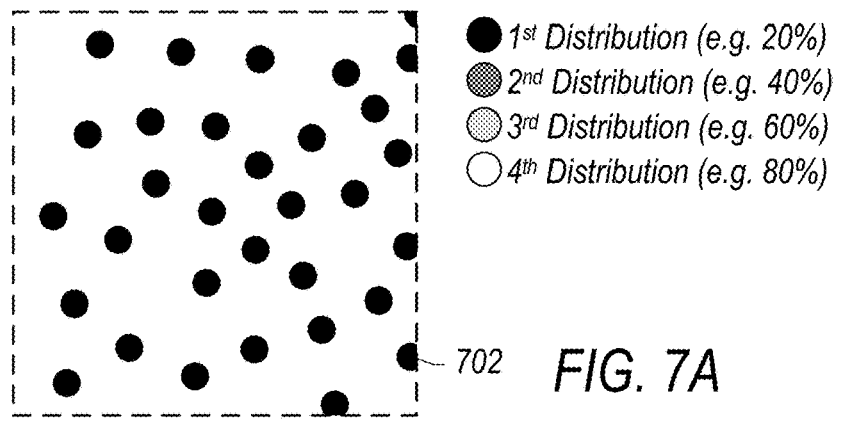
FIGS. 7A-7D illustrate progressive rendering of re-sampled points of a re-sampled version of the point cloud, wherein the re-sampled points are rendered in a "pyramidal" order such that the re-sampled points are evenly distributed at the various levels of rendering, e.g. 20% of re-sampled points rendered, 40% of re-sampled points rendered, etc., according to some embodiments.
Figure 7B:
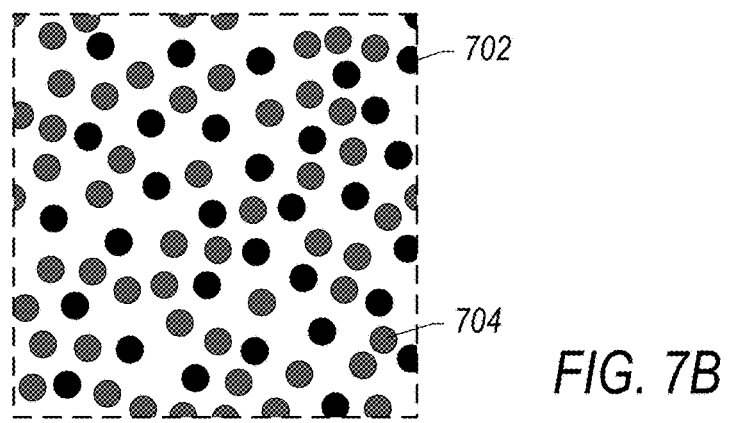
Figure 7C:
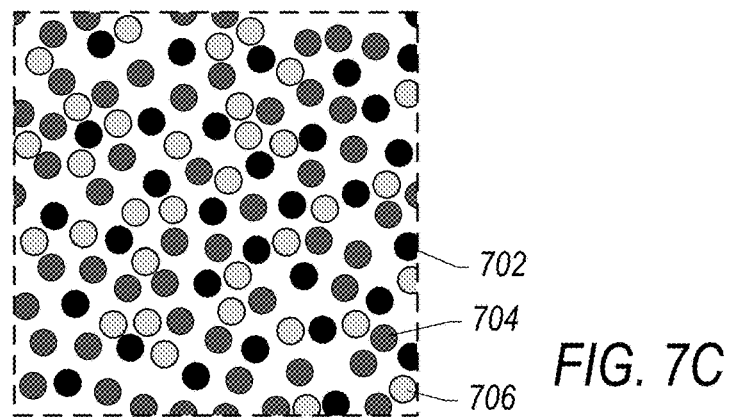
Figure 7D:
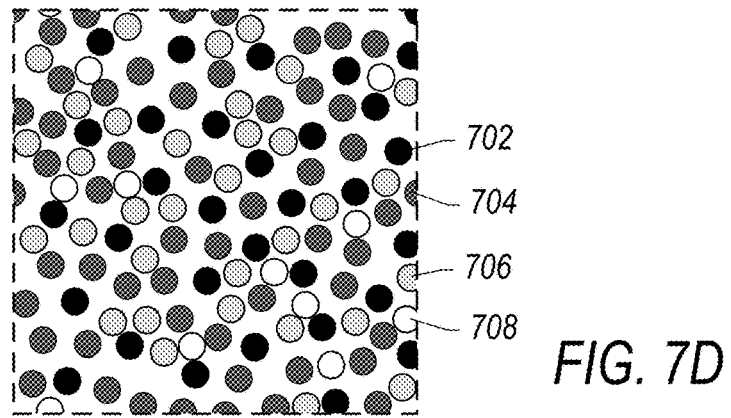

FIGS. 7A-7D illustrate progressive rendering of re-sampled points of a re-sampled version of the point cloud, wherein the re-sampled points are rendered in a "pyramidal" order such that the re-sampled points are evenly distributed at the various levels of rendering, e.g. 20% of re-sampled points rendered, 40% of re-sampled points rendered, etc., according to some embodiments. As discussed above, a hierarchical sphere distribution with a "pyramidal" ordering may be used to re-sample a point cloud, such as a hierarchical Poisson sphere distribution. Such a distribution may have an even distribution throughout space and no regular pattern. For example, a 'blue noise' distribution may be used to avoid low-frequency correlations between the spheres that may produce artifacts in the re-sampled version of the point cloud. Also, a hierarchical sphere distribution, such as the Poisson sphere distribution, may maintain these properties (e.g. even distribution and no regular pattern) at varying levels of density. Also, the density may be adjusted by only rendering re-sampled points with index values up to a point. For example if there are 100 index values used for 100 spheres per 3D partition, rendering index values 1-20 would result in a 20% density, rendering index values 1-40 would result in a 40% density, and so on. For example FIG. 7A shows re-sampled points 702 which may correspond to a first range of index values and which result in a 20% density. FIG. 7B adds re-sampled points 704 which may correspond to a second range of index values and when rendered with re-sampled points 702 results in a 40% density. FIG. 7C adds re-sampled points 706 which may correspond to a third range of index values and when rendered with re-sampled points 702 and 704 result in a 60% density. FIG. 7D adds re-sampled points 708 which may correspond to a fourth range of index values and when rendered with re-sampled points 702, 704, and 706 result in an 80% density. As noted above, in some embodiments, the overall density of the point cloud may also be adjusted by partitioning the point cloud into smaller (and more) 3D partitions. Additionally, when rendering, the density of the rendered re-sampled version of the point cloud may be adjusted by only rendering some of the re-sampled points, for example based on index values. Alternatively, the re-sampled points may be rendered based on partition ID in order to achieve certain visual effects, such as a vertical or side-to-side wipe, as further discussed in FIG. 12.

As discussed above, in regard to FIG. 7, a re-sampled version of the point cloud, when rendered with the re-sampled points in ascending (or descending) index value order, results in a "pyramidal" filling of the point cloud from a lower re-sampled point density to a higher re-sampled point density. However, even at the lower re-sampled point densities, the re-sampled points are evenly distributed and do not follow a regular pattern, thus avoiding artifacts. These properties of a re-sampled version of the point cloud, re-sampled using a hierarchical sphere distribution, can be exploited to perform progressive streaming and/or progressive rendering.

Figure 8A:
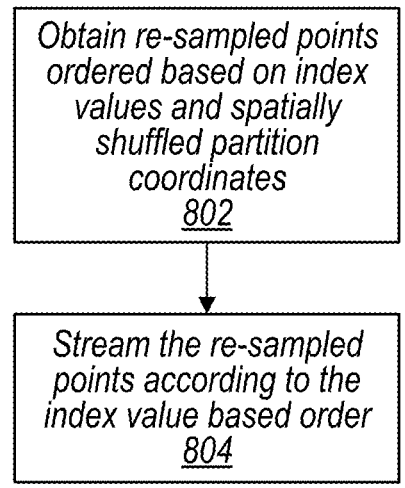
FIG. 8A illustrates the re-sampled points of the re-sampled version of the point cloud that are ordered based on index values and streamed according to the determined order, according to some embodiments.

For example, FIG. 8A illustrates the re-sampled points of the re-sampled version of the point cloud that are ordered based on index values and streamed according to the determined order, according to some embodiments. In some embodiments, a re-sampling and/or encoding device orders the determined re-sampled points based on the index values of the re-sampled points. For example, wherein the re-sampled points are identified by (X,Y,Z of the 3D partition and index value (I) of the bin and corresponding sphere), the re-sampled points may be ordered in ascending or descending index (I) order. For example all re-sampled points with an index value of 1 may be ordered first, then all re-sampled points with an index value of 2 may be ordered next, and so on. Depending on how many 3D partitions are generated and how many of the respective points are assigned to the index 1 bin, index 2 bin, etc., of each 3D partition, there may be up to the 3D partition count number of re-sampled points with a given index value (e.g. an index 1 included in each 3D partition, an index 2 included in each 3D partition, and so on for a plurality of 3D partitions of the re-sampled point cloud). For example, at block 802, the re-sampled points are ordered based on index values, e.g. ascending index value order. Then, at block 804, the re-sampled points are streamed to a receiving device (e.g. renderer and/or decoder) in the order determined at 802. This allows for the points to be rendered while being streamed, wherein the rendered points fill in the re-sampled version of the point cloud in a pyramidal order.

In some embodiments, re-sampled points sharing a sample index value (I) may be sorted using a quasi-random sequence generated based on the respective X, Y, and/or Z values of the re-sampled points sharing the same sample index value (I). For example, in some embodiments, a bit-reversed Morton or Hilbert coding may be used. As another example, in some embodiments, 3D indices for the re-sampled points sharing the same sample index value (I) may be converted into a 1D list using a space-filling curve, such as a Z-curve of Morton or a Hilbert curve. The space-filling curve may correlate to spatial locations of the respective re-sampled points having the same sample index value (I). Next, forming a permutation like bit-reversal may spatially shuffle the re-sampled points sharing the same sample index value (I). This may de-correlate the res-sampled points and avoid patterns at the scale of the partitions.

Figure 8B:
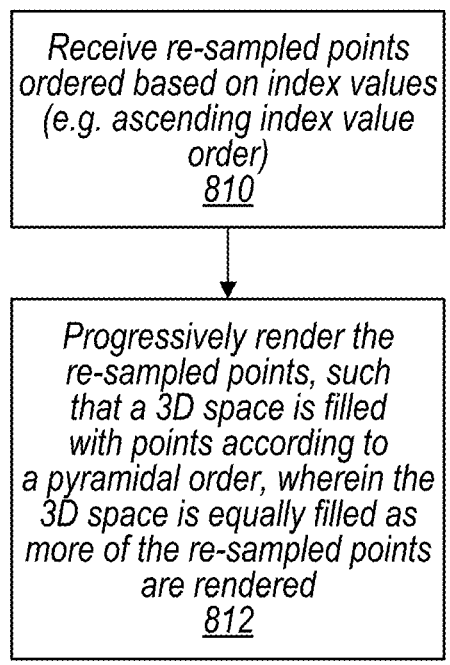
FIG. 8B illustrates the re-sampled points of the re-sampled version of the point cloud being received in an order based on index values (e.g. ascending index value order) and being progressively rendered in the received order, according to some embodiments.

FIG. 8B illustrates the re-sampled points of the re-sampled version of the point cloud being received in an order based on index values (e.g. ascending index value order) and being progressively rendered in the received order, according to some embodiments. At bock 810 the re-sampled points are ordered based on their respective index values. This is analogous to block 802, but may be performed by a decoding and/or rendering device instead of a re-sampling and/or encoding device. At block 812, the re-sampled points may be progressively rendered according to the order determined at 810.

Figure 9:
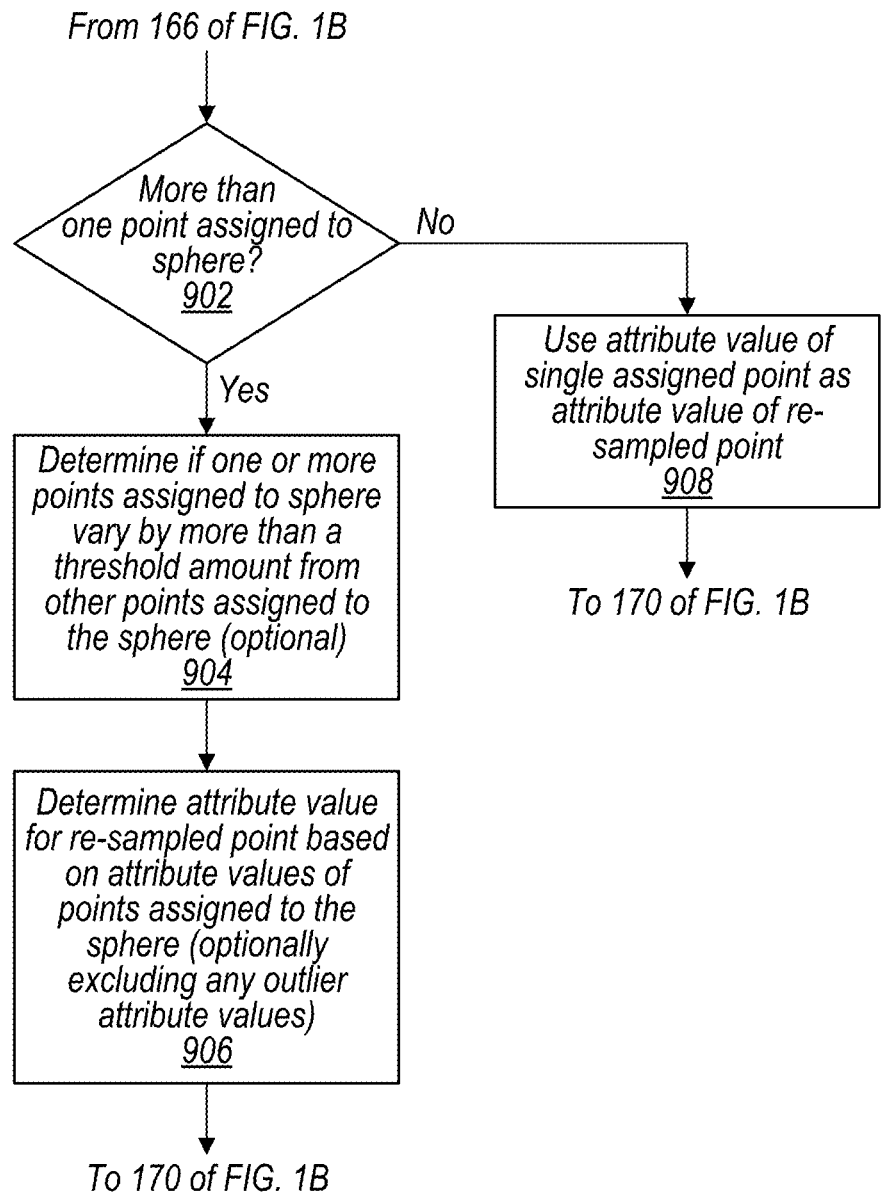
FIG. 9 illustrates a process for determining attribute values for the re-sampled points of the re-sampled version of the point cloud, according to some embodiments.

FIG. 9 illustrates a process for determining attribute values for the re-sampled points of the re-sampled version of the point cloud, according to some embodiments.

As discussed in regard to FIG. 6, in some embodiments, composite attribute values may be determined for the re-sampled points. For example in some embodiments, blocks 902 through 908 may be performed between block 166 and block 170 of FIG. 1B to further determine a composite attribute value for the re-sampled point. In some embodiments, at block 902, a re-sampling and/or encoding device determines if there are more than one original point assigned to a bin for which a re-sampled point is being included in the re-sampled version of the point cloud (e.g. the inclusion threshold has been met). If not (e.g. there is only one assigned point), then at block 908 the attribute value of the single assigned point for the bin is carried over to the re-sampled point for that bin. If not, at block 904, the re-sampling and/or encoding device determines if the assigned points have attribute values (of a same type) that vary by more than a threshold amount. Note that same type means, for example, a same color channel, e.g. R or G or B. Also a same type may be a normal vector, reflectivity, etc. At block 906, the re-sampling and/or encoding device determines a composite attribute value for the re-sampled point based on attribute values of original points assigned to a bin corresponding to the re-sampled point, wherein points with attribute values that exceed the variance threshold are not used when determining an average attribute value for the re-sampled point. Also such outlier points may be omitted in other composition techniques to determine the attribute value for the re-sampled point.

Figure 10:
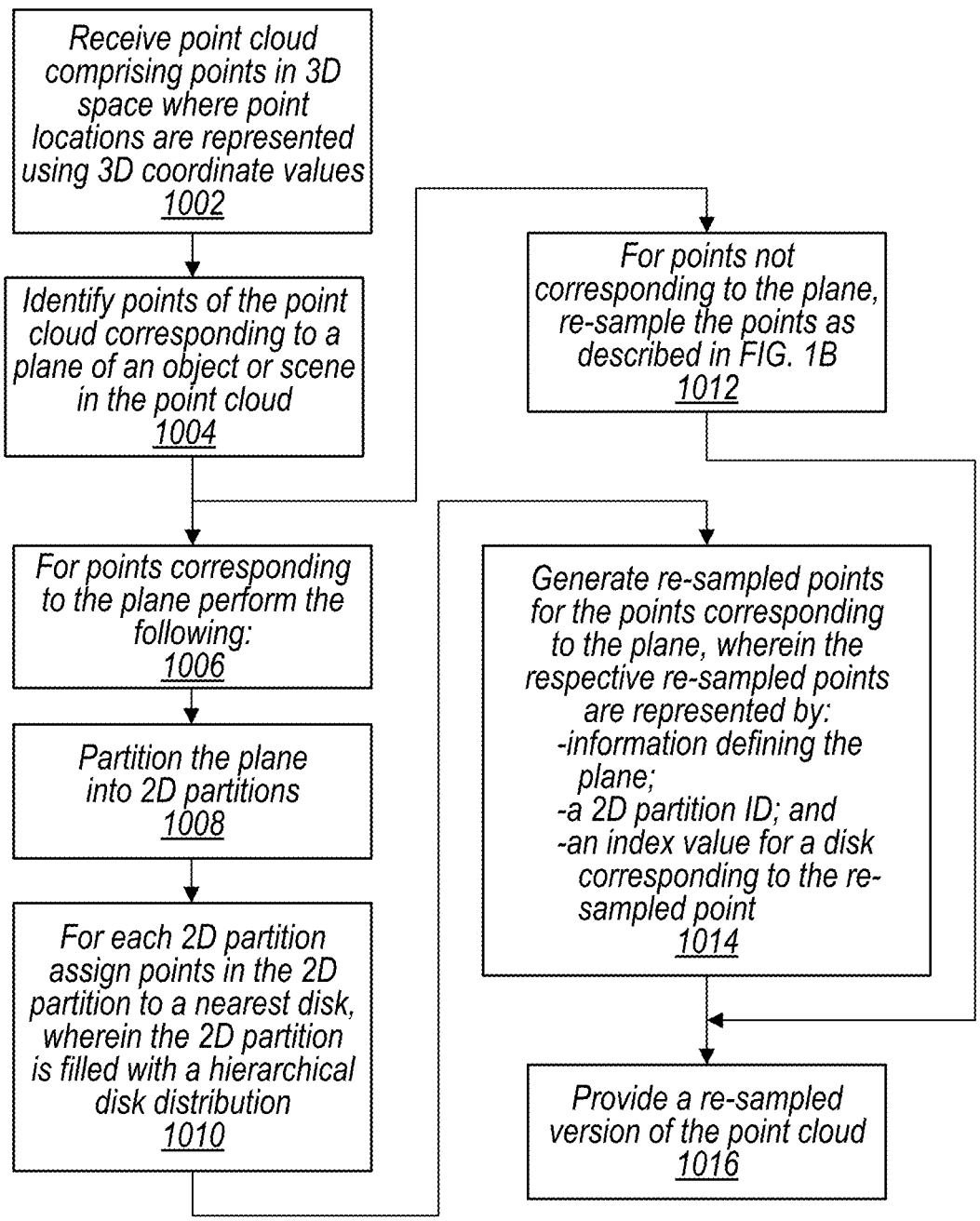
FIG. 10 illustrates a process for re-sampling points of a point cloud falling within a plane using a hierarchical disk distribution, according to some embodiments.

FIG. 10 illustrates a process for re-sampling points of a point cloud falling within a plane using a hierarchical disk distribution, according to some embodiments.

A similar procedure as described in FIG. 1B may be applied in two-dimensions for points falling within a plane. However, a hierarchical disk distribution may be used in the plane instead of a spherical distribution. For example, at block 1002, a re-sampling and/or encoding device receives points of a point cloud, wherein locations of the points are represented in 3D space by three coordinates per point. At block 1004, the re-sampling and/or encoding device identifies points of the point cloud corresponding to an object having a planar surface or a scene comprising a plane, such as a wall. For the remaining points not residing in the plane, the remaining points are re-sampled at block 1012 according to the process shown in FIG. 1B. However at block 1006, for the points falling within the plane, at block 1008 the plane is partitioned into 2D partitions. At block 1010 each 2D partition is filled with disks according to a hierarchical disk distribution, such as a Poison disk distribution. Also, at block 1010 points in a given 2D partition are assigned to a nearest disk in a similar manner as described in FIG. 1B, except in 2D space instead of 3D space. At block 1014, re-sampled points are generated based on disks having assigned points greater than an inclusion threshold. The re-sampled points are identified by the plane to which they belong and then three integers, e.g. an X and Y integer that locates a 2D partition in the plane and an index value that locates a bin and corresponding disk for the re-sampled point. At block 1016 the re-sampled version of the point cloud is provided, wherein the re-sampled version comprises the re-sampled points generated at block 1014 and the re-sampled points generated via the process described in FIG. 1B for other points of the point cloud not residing in a plane.

Figure 11:
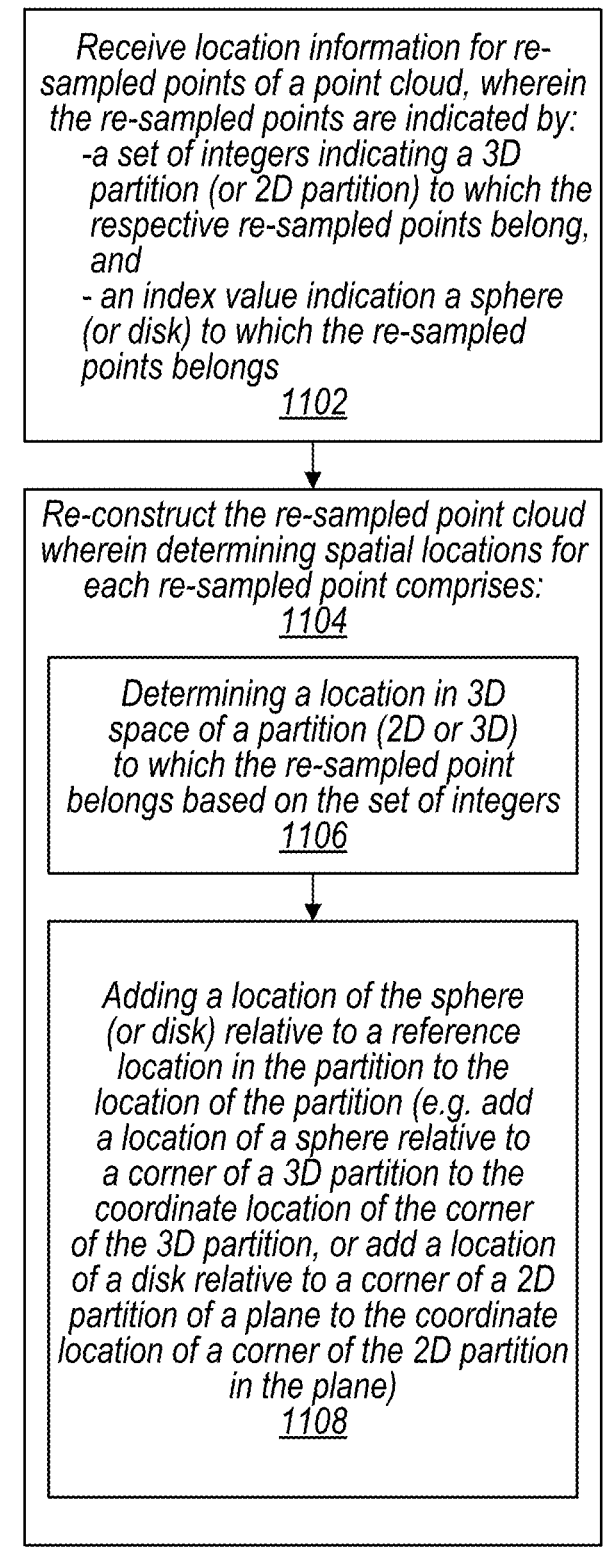
FIG. 11 illustrates a process of receiving and re-constructing the re-sampled version of the point cloud, according to some embodiments.

FIG. 11 illustrates a process of receiving and re-constructing the re-sampled version of the point cloud, according to some embodiments. At block 1102, the rendering and/or decoding device receives location information for re-sampled points of a point cloud, such as location information for re-sampled points determined by a re-sampling and/or encoding device, as described in FIG. 1B and/or FIG. 10. At block 1104, the rendering and/or decoding device reconstructs the re-sampled version of the point cloud using the location information received at block 1102. Note that additionally composite attribute values may also be received at block 1102 and used to reconstruct the re-sampled version of the point cloud at block 1104. To reconstruct the re-sampled version of the point cloud, at block 1106, the rendering and/or decoding device determines locations in 3D space for the respective 3D partitions (or 2D partitions) to which the re-sampled points belong, based on the set of integers defining the positions of the respective partitions in the partitioned space. At block 1108, the rendering and/or decoding device adds location information for the spheres corresponding to the index values of the re-sampled points to a reference point in the partition to which the re-sampled point belongs. For example, a pre-calculated location for a sphere 1 corresponding to index value 1 may be added to a known spatial location for a corner of the partition to which the sphere 1 belongs. A similar process may be performed in 2D using disks for re-sampled points falling in a plane.

Figure 12:
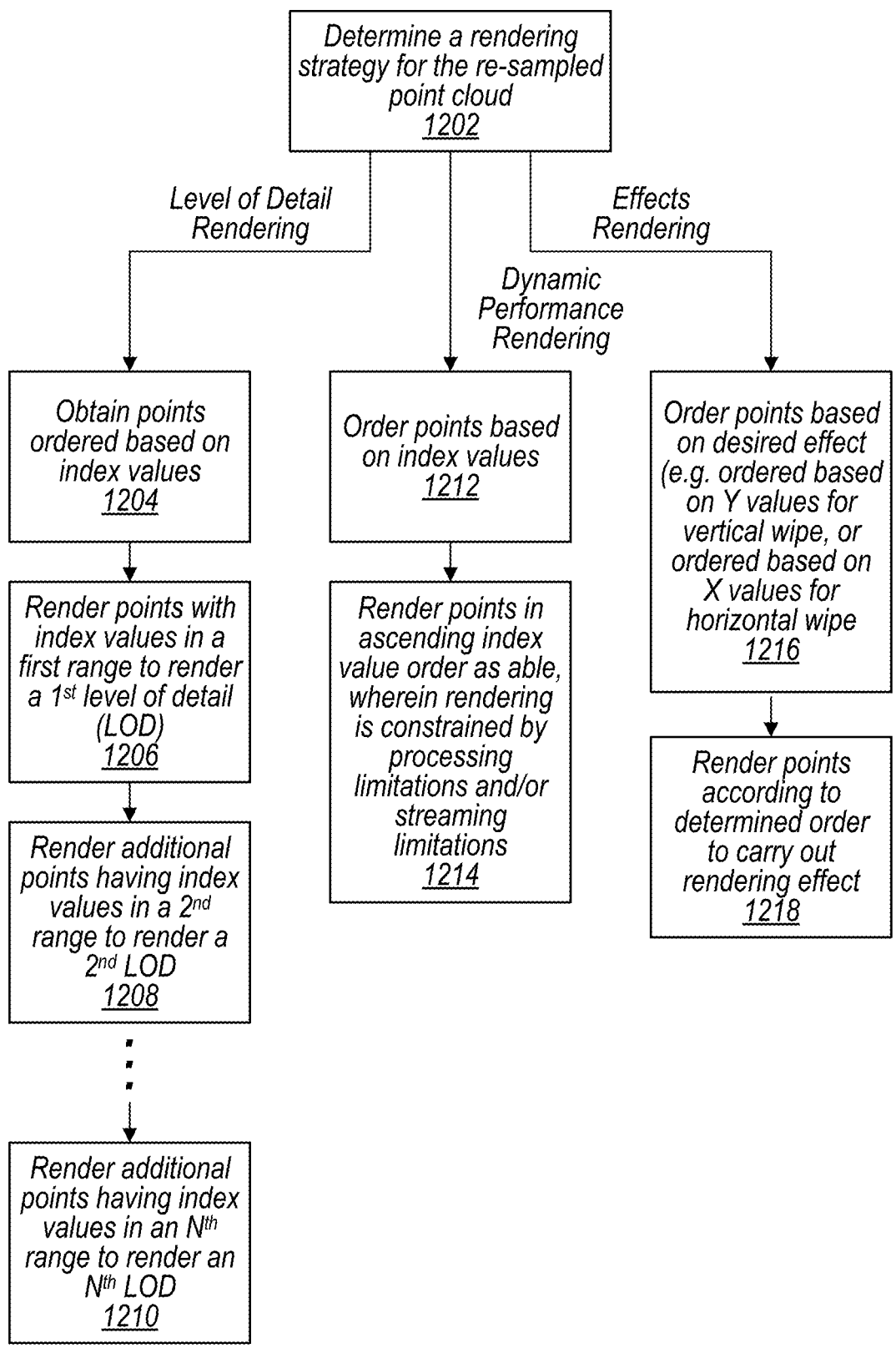
FIG. 12 illustrates processes for ordering the re-sampled points of the re-sampled version of the point cloud in various orders to achieve various rendering properties or effects, according to some embodiments.

FIG. 12 illustrates processes for ordering the re-sampled points of the re-sampled version of the point cloud in various orders to achieve various rendering properties or effects, according to some embodiments.

At block 1202 a rendering and/or decoding device determines a rendering strategy for rendering a re-sampled point cloud, such as a level of detail rendering strategy, a dynamic performance rendering strategy, an effects rendering strategy, etc. For a level of detail rendering strategy, at block 1204, the rendering and/or decoding device orders the re-sampled points based on their index values. It is worth noting that because the re-sampled point identifiers are organized, for example as shown in FIG. 4A/4B with a nearest sphere ID and a partition ID, obtaining the re-sampled points in an order according to the index values may simply require reading the points in ascending or descending closest sphere ID order. For example, all index values of 1 may be read first, then index values of 2, etc. In some embodiments, within an index value the partition IDs may be read in order, for example, ascending X values, or may be randomized, for example to avoid a pattern of partition filling. At block 1206, re-sampled points with index values falling within a first index value range are rendered which results in a first level of detail, such as a 20% point density as shown in FIG. 7A. At block 1208 re-sampled points having index values in a second index value range are rendered and added to the reconstructed point cloud along with the re-sampled points rendered at block 1206. This process may be repeated for subsequent levels of detail, as described in block 1210.

In order to perform dynamic performance rendering, at block 1212, the re-sampling device or the rendering device (or the encoder or decoder) determines an ordering of the re-sampled points based on index values. At block 1214, the rendering device renders re-sampled points in ascending or descending index value, as able, due to any performance constraints such as processing limitations and/or streaming limitations.

In order to perform effects rendering, at block 1216 the rendering device (or the re-sampling device) (or the encoder or decoder) orders the re-sampled points based on a desired effect order, such as a Y value order to perform a vertical wipe or an X value order to perform a side to side wipe. Note that the X and Y values are the locations of the 3D partitions, no necessarily absolute X and Y coordinates of the re-sampled points. At block 1218, the rendering device renders the re-sampled points in the determined order to achieve the effect, e.g. vertical wipe, side-to-side wipe, etc. Also, in some embodiments, a "spotlighting" effect may be achieved by rendering re-sampled points with X and Y values for 3D partitions falling within the "spotlight" to a greater index depth than is used to render re-sampled points in 3D partitions outside of the "spotlight."

Figure 13:
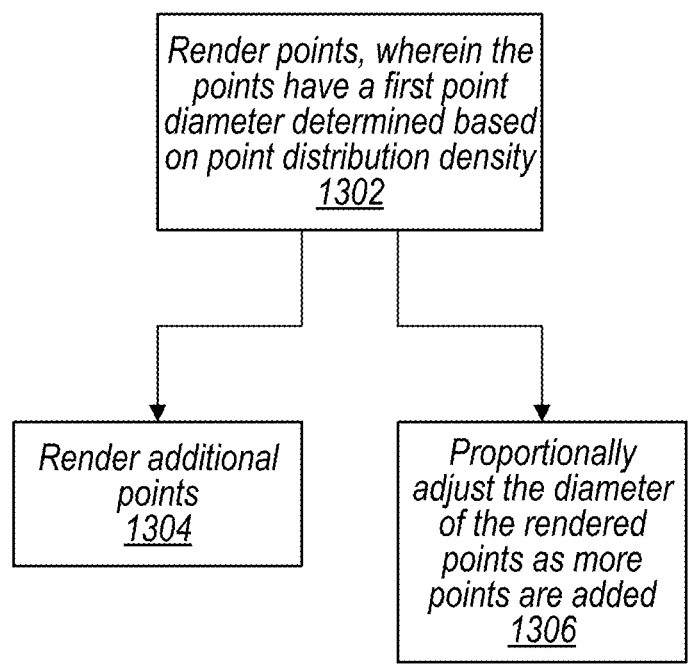
FIG. 13 illustrates adaptively sizing rendered re-sampled points of the re-sampled version of the point cloud based on how densely or sparsely the re-sampled version of the point cloud is being rendered, according to some embodiments.

FIG. 13 illustrates adaptively sizing rendered re-sampled points of the re-sampled version of the point cloud based on how densely or sparsely the re-sampled version of the point cloud is being rendered, according to some embodiments. In some embodiments, point sizes may be scaled with density. For example, re-sampled points may initially be rendered with larger diameter points and the point diameters may be dynamically adjusted down as more re-sampled points are rendered. For example, at block 1302 re-sampled points are rendered with a first diameter. At block 1304 more re-sampled points are rendered and at the same time at block 1306 the diameters of the already rendered re-sampled points and the newly rendered re-sampled points are dynamically reduced in proportion to the point density of the rendered re-sampled points.

Example Computer System

Figure 14:
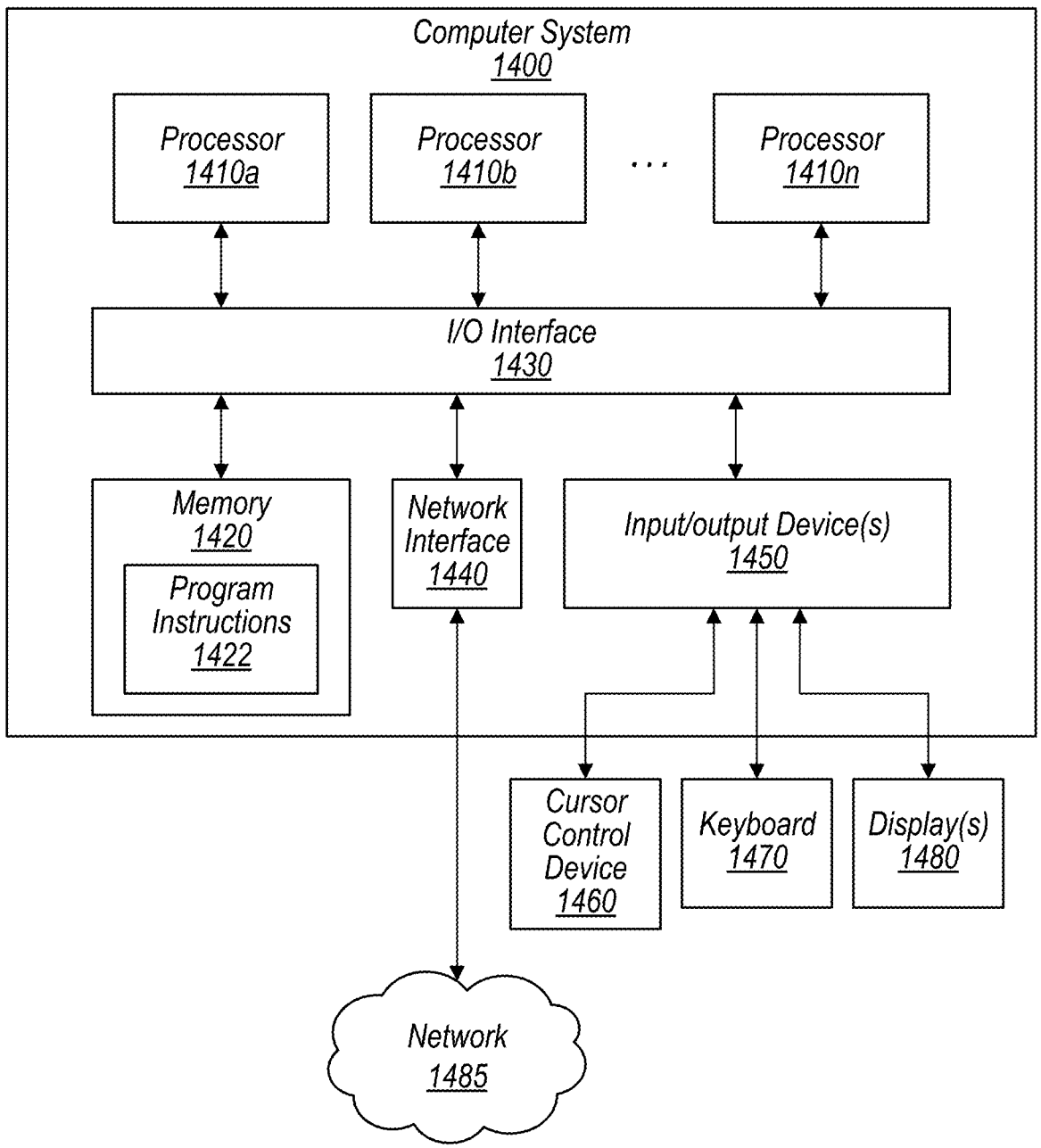
FIG. 14 illustrates an example computer system that may implement an encoder or decoder, according to some embodiments.

FIG. 14 illustrates exemplary computer system 1400 usable to implement a re-sampler and/or encoder or a decoder and/or renderer as described above with reference to FIGS. 1-13). In different embodiments, computer system 1400 may be any of various types of devices, including, but not limited to, a personal computer system, desktop computer, laptop, notebook, tablet, slate, pad, or netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of program instructions for re-mapping, rendering, encoding, or decoding a point cloud, as described herein, may be executed in one or more computer systems 1400, which may interact with various other devices. Note that any component, action, or functionality described above with respect to FIGS. 1-13 may be implemented on one or more computers configured as computer system 1400 of FIG. 14, according to various embodiments. In the illustrated embodiment, computer system 1400 includes one or more processors 1410 coupled to a system memory 1420 via an input/output (I/O) interface 1430. Computer system 1400 further includes a network interface 1440 coupled to I/O interface 1430, and one or more input/output devices 1450, such as cursor control device 1460, keyboard 1470, and display(s) 1480. In some cases, it is contemplated that embodiments may be implemented using a single instance of computer system 1400, while in other embodiments multiple such computer systems, or multiple nodes making up computer system 1400, may be configured to host different portions or instances program instructions for re-mapping, rendering, encoding, or decoding points cloud as described above for various embodiments. For example, in one embodiment some elements of the program instructions may be implemented via one or more nodes of computer system 1400 that are distinct from those nodes implementing other elements.

In some embodiments, computer system 1400 may be implemented as a system on a chip (SoC). For example, in some embodiments, processors 1410, memory 1420, I/O interface 1430 (e.g. a fabric), etc. may be implemented in a single SoC comprising multiple components integrated into a single chip. For example an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1420 may be configured to store compression or decompression program instructions 1422 and/or sensor data accessible by processor 1410. In various embodiments, system memory 1420 may be implemented using any suitable memory technology, such as static random access memory (SRAM), synchronous dynamic RAM (SDRAM), nonvolatile/Flash-type memory, or any other type of memory. In the illustrated embodiment, program instructions 1422 may be configured to implement any of the functionality described above. In some embodiments, program instructions and/or data may be received, sent or stored upon different types of computer-accessible media or on similar media separate from system memory 1420 or computer system 1400.

In one embodiment, I/O interface 1430 may be configured to coordinate I/O traffic between processor 1410, system memory 1420, and any peripheral devices in the device, including network interface 1440 or other peripheral interfaces, such as input/output devices 1450. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices attached to a network 1485 (e.g., carrier or agent devices) or between nodes of computer system 1400. Network 1485 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1450 may, in some embodiments, include one or more display terminals, keyboards, keypads, touchpads, scanning devices, voice or optical recognition devices, or any other devices suitable for entering or accessing data by one or more computer systems 1400. Multiple input/output devices 1450 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1440.

As shown in FIG. 14, memory 1420 may include program instructions 1422, which may be processor-executable to implement any element or action described above. In one embodiment, the program instructions may implement the methods described above. In other embodiments, different elements and data may be included.

Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device comprising:
a memory storing program instructions; and
one or more processors configured to execute the program instructions, wherein the program instructions, when executed using the one or more processors, cause the one or more processors to:
receive a re-sampled point cloud comprising, for each re-sampled point:
a set of integers identifying a 3D partition to which the respective re-sampled point belongs; and
an index value identifying a sphere of the respective 3D partition to which the respective re-sampled point belongs; and
reconstruct the re-sampled point cloud, wherein to reconstruct the re-sampled point cloud, the program instructions cause the one or more processors to, for each of the re-sampled points:
determine a location for the respective re-sampled point in 3D space based on adding a pre-calculated location value for the sphere to which the respective re-sampled point belongs to a location value for the 3D partition comprising the sphere to which the re-sampled point belongs.

2. The device of claim 1, wherein the program instruction, when executed using the one or more processors, further cause the one or more processors to:
sort the re-sampled points based on the index values or integer values; and
fill a space with the re-sampled points according to the sorted order.

3. The device of claim 2, wherein the sorted order comprises:
an ordering of the re-sampled points based on the index values such that the space is progressively filed in an approximately even manner;
an ordering of the re-sampled points based on Y integer values included in the set of integer values identifying the 3D partitions to which the re-sampled points belong such that the space is filled in a upward or downward wipe;
an ordering of the re-sampled points based on X integer values included in the set of integer values identifying the 3D partitions to which the re-sampled points belong such that the space is filled in a side-to-side wipe; or
an order wherein a given portion of the space is filled with re-sampled points to a deeper index value than other portions of the space such that a spotlight effect is performed in the given portion.

4. A non-transitory computer-readable medium storing program instructions that, when executed using one or more processors, cause the one or more processors to:
receive a re-sampled point cloud comprising for each re-sampled point:
a set of integers identifying a 3D partition to which the respective re-sampled point belongs; and
an index value identifying a sphere of the respective 3D partition to which the respective re-sampled point belongs; and
reconstruct the re-sampled point cloud, wherein to reconstruct the re-sampled point cloud, the program instructions cause the one or more processors to, for each of the re-sampled points:

determine a location for the respective re-sampled point in 3D space based on adding a pre-calculated location value for the sphere to which the respective re-sampled point belongs to a location value for the 3D partition comprising the sphere to which the re-sampled point belongs.

5. The non-transitory computer-readable medium of claim 4, wherein the program instructions, cause the one or more processors to progressively reconstruct the re-sampled point cloud, wherein re-sampled points are added in an order according to their respective index values.

6. The non-transitory computer-readable medium of claim 5, wherein the program instructions, cause the one or more processors to adaptively size the re-sampled points such that respective diameters of the points are reduced as additional re-sampled points are added to the reconstructed version of the re-sampled point cloud.

7. The non-transitory computer-readable medium of claim 4, wherein the program instructions, cause the one or more processors to progressively reconstruct the re-sampled point cloud, wherein the re-sampled points are added to the reconstructed version of the re-sampled point cloud based, at least in part, on:
    a level of detail indicated for rendering the reconstructed version of the re-sampled point cloud;
    a dynamic rendering threshold based on performance capacities of the one or more processors; or
    a dynamic rendering threshold based on streaming performance for receiving the re-sampled points of the re-sampled point cloud.

8. A non-transitory computer-readable medium storing program instructions that, when executed using one or more processors, cause the one or more processors to:
    partition a 3D space into a plurality of 3D partitions and for each respective 3D partition:
        assign points located in the respective 3D partition to a nearest sphere within the 3D partition, wherein a hierarchical sphere distribution is used to at least partially fill the respective 3D partition with spheres;
        generate re-sampled points corresponding to respective ones of the spheres to which at least a threshold number of points have been assigned, wherein locations of the re-sampled points are represented by:
            a set of integers identifying the respective 3D partition to which a respective re-sampled point belongs; and
            an index value identifying a sphere of the respective 3D partition to which the respective re-sampled point belongs; and
    provide the sets of integers and the index values representing the locations of the re-sampled points.

9. The non-transitory computer-readable medium of claim 8, wherein:
    the 3D coordinate values for the respective points comprise a floating point X coordinate value, a floating point Y coordinate value, and a floating point Z coordinate value;
    the set of integers identifying the respective 3D partition comprise a fixed point integer indicating an X grid location, a fixed point integer indicating a Y grid location, and a fixed point integer indicating a Z grid location for the respective 3D partition; and
    the index value identifying the sphere comprises a fixed point integer value.

10. The non-transitory computer-readable medium of claim 8, wherein the program instructions, when executed using the one or more processors, further cause the one or more processors to:
    re-order the re-sampled points based on index values, wherein a same hierarchical sphere distribution and a same index scheme is used for the plurality of 3D partitions of the 3D space.

11. The non-transitory computer-readable medium of claim 10, wherein to provide the sets of integers and the index values representing the locations of the re-sampled points, the program instructions, when executed using the one or more processors, cause the one or more processors to:
    stream the re-ordered re-sampled points in ascending or descending index value order.

12. The non-transitory computer-readable medium of claim 11, wherein the sub-sampled points re-ordered according to the index values results in a pyramidal ordering of the points such that a space is filled approximately equally as more of the re-sampled points are added to the space according to the index value order.

13. The non-transitory computer-readable medium of claim 8, wherein the threshold number of assigned points is 1, such that a re-sampled point is generated for each sphere comprising at least one assigned point.

14. The non-transitory computer-readable medium of claim 8, wherein the points further comprise attribute values, and wherein the program instructions further cause the one or more processors to:
    for respective ones of the spheres to which two or more points have been assigned:
        determine a re-sampled attribute value for a re-sampled point corresponding to the respective sphere, wherein the re-sampled attribute value is determined based on the attribute values of the two or more points assigned to the sphere.

15. The non-transitory computer-readable medium of claim 14, wherein the re-sampled attribute value is an average of the attribute values of the two or more points assigned to the sphere.

16. The non-transitory computer-readable medium of claim 15, wherein the program instructions further cause the one or more processors to:
    determine if respective ones of the two or more points assigned to the sphere represent an edge of an object; and
    exclude other ones of the points assigned to the sphere, if present, that do not represent the edge when determining the re-sampled attribute value for the re-sampled point corresponding to the sphere.

17. The non-transitory computer-readable medium of claim 8, wherein the points are points of a received point cloud, and wherein the program instructions, when executed using the one or more processors, further cause the one or more processors to:
    receive a second point cloud comprising points located in the 3D space;
    for each respective 3D partition:
        assign points of the second point cloud located in the respective 3D partition to a nearest respective one the spheres within the 3D partition;
        wherein the re-sampled points for the respective 3D partition are generated based on the assigned points of the point cloud and the assigned points of the second point cloud; and
    provide a combined re-sampled version of the point cloud and the second point cloud.

18. The non-transitory computer-readable medium of claim 8, wherein the hierarchical sphere distribution is a hierarchical Poisson sphere distribution that is pre-calculated at an encoder executing the program instructions.

19. The non-transitory computer-readable medium of claim 18, wherein the hierarchical Poisson sphere distribution pre-calculated at the encoder is normative such that the hierarchical Poisson sphere distribution is known by a decoder.

20. The non-transitory computer-readable medium of claim 8, wherein the program instructions, when executed using the one or more processors, further cause the one or more processors to:

identify respective ones of the points corresponding to a plane of an object or scene;

partition the plane into a plurality of 2D partitions;

for the points corresponding to the plane, instead of assigning the points corresponding to the plane to a nearest sphere within the 3D partition, for each respective 2D partition:

assign the points of the plane located in the respective 2D partition to a nearest disk within the 2D partition, wherein a hierarchical disk distribution is used to at least partially fill the respective 2D partition with discs; and generate re-sampled points corresponding to the respective ones of the disks to which at least a threshold number of points have been assigned, wherein the re-sampled points in the plane are represented by:

information defining the plane;

a set of integers identifying the respective 2D partition to which a respective re-sampled point in the plane belongs; and an index value identifying a disk of the respective 2D partition to which the respective re-sampled point in the plane belongs;

wherein the provided re-sampled version comprises:

the sets of integers and the index values representing the locations of the re-sampled points not included in the plane; and the information defining the plane, the sets of integers, and the index values representing the re-sampled points in the plane.

\* \* \* \* \*